United States Patent
Gangolli et al.

(10) Patent No.: US 10,809,913 B1
(45) Date of Patent: Oct. 20, 2020

(54) GESTURE-BASED INTERACTIONS FOR DATA ANALYTICS

(71) Applicant: SAP SE, Walldorf (DE)

(72) Inventors: Sameep Jayant Gangolli, Bangalore (IN); Shikhar Raje, Mumbai (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/395,013

(22) Filed: Apr. 25, 2019

(51) Int. Cl.
*G06F 3/0488* (2013.01)
*G06F 3/0484* (2013.01)
*G06F 16/248* (2019.01)
*G06F 16/245* (2019.01)

(52) U.S. Cl.
CPC ...... *G06F 3/04883* (2013.01); *G06F 3/04845* (2013.01); *G06F 3/04847* (2013.01); *G06F 16/245* (2019.01); *G06F 16/248* (2019.01)

(58) Field of Classification Search
CPC .................................................. G06F 3/0481
See application file for complete search history.

(56) References Cited

U.S. PATENT DOCUMENTS

| | | | | |
|---|---|---|---|---|
| 2016/0154575 | A1* | 6/2016 | Xie | G06F 3/0481 715/771 |
| 2016/0246871 | A1* | 8/2016 | Singh | G06F 16/285 |
| 2018/0075115 | A1* | 3/2018 | Murray | G06F 16/248 |
| 2018/0336638 | A1* | 11/2018 | Dziabiak | G06Q 40/08 |
| 2018/0341839 | A1* | 11/2018 | Malak | G06F 40/205 |
| 2019/0095508 | A1* | 3/2019 | Porath | G06F 16/34 |

OTHER PUBLICATIONS

"Gestures: Gestures for navigation and actions," available at: https://sailfishos.org/design/gestures/, 4 pages, retrieved Apr. 23, 2019.
Wilson, "What's the difference between a measure and dimension?" SAP Analytics Cloud, available at: https://www.sapanalytics.cloud/modeling-measures-dimensions/, 3 pages, retrieved Apr. 23, 2019.

* cited by examiner

*Primary Examiner* — Cao H Nguyen
(74) *Attorney, Agent, or Firm* — Klarquist Sparkman, LLP

(57) ABSTRACT

A process for traversing or manipulating data of a data display is provided. A gesture identifier may be received indicating a display control gesture was received by a sensor. The gesture identifier may be associated with a change in one or more dimensions of the data display. Configuration data for the gesture identifier may be accessed to determine an action, and one or more parameters associated with the gesture identifier, for execution. The action may determine one or more options for traversing or manipulating the data visualization or displayed data set. The associated action may be executed using the one or more parameters. Executing the action may include generating an updated set of dimensions based at least in part on the one or more parameters, retrieving a set of database data defined by the updated dimensions, and generating a display of the retrieved set of database data.

20 Claims, 23 Drawing Sheets

GESTURE-BASED INTERACTIONS FOR DATA ANALYTICS

FIELD

The present disclosure generally relates to user interfaces, such as graphical user interfaces and UI controls, including UI controls associated with touch or motion sensors. Particular implementations relate to gesture controls for data visualization and analytics, and systems and methods for implementing gesture controls for data visualization and analytics.

BACKGROUND

Data visualization and data analytics systems are becoming ever more central to computing. Allowing users to easily and readily manipulate the presented information is key to using analytical systems, yet user interface (UI) controls are often cumbersome, or ineffective at intuitively or easily transforming data presentations. Further, most UI controls do not readily or effectively translate amongst the plethora of computing devices now available, and that may all be used at different times by the same user. Thus, there is room for improvement.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A process for traversing data of a data display is provided herein. A first set of database data may be defined based at least in part on a first set of one or more filters. The database data may be associated with a plurality of fields and database data metadata, and a first filter of the first set of one or more filters may define a first value or a first range of values for a first field of the plurality of fields associated with the first set of database data. The first set of database data may be retrieved from a database based at least in part on the first set of one or more filters or may be selected based at least in part on the first set of one or more filters of the first set of database data from a second set of database data retrieved from the database. A display of a data visualization for the first set of database data may be generated.

A gesture identifier may be received indicating a display control gesture was received by a sensor. The gesture identifier may be associated with a change in the first range of values for the first filter of the first set of one or more filters, a change in the first value, or a change in database data metadata used to define, at least in part, the data visualization. Configuration data for the gesture identifier may be accessed to determine an action, and one or more parameters associated with the gesture identifier, for execution. The action may determine that the first value, at least a portion of the first range of values of the first filter is to be changed, or different database data metadata is to be used to generate the data visualization, and the one or more parameters indicate at least in part an amount by which the first range of values of the at least a first filter should be changed, at least one new value that should be assigned to the at least a first filter, or database data metadata used to modify the data visualization.

The associated action may be executed using the one or more parameters. Executing the action may include generating an updated first set of filters based at least in part on the one or more parameters. Executing the action may further include retrieving a third set of database data defined by the updated first set of filters. Executing the action may include also generating a display of the retrieved third set of database data in the data visualization based at least in part on the updated first set of filters.

A process for zooming of displayed data is provided herein. A first set of database data may be defined based at least in part on a first set of one or more filters, and the database data may be associated with a plurality of fields and database data metadata. A first filter of the first set of one or more filters may define a first value or a first range of values for a first field of the plurality of fields associated with the first set of database data. The first set of database data may be retrieved from a database based at least in part on the first set of one or more filters or may be selected based at least in part on the first set of one or more filters of the first set of database data from a second set of database data retrieved from the database. A display of a data visualization for the first set of database data may be generated.

A gesture identifier may be received indicating a display control gesture was received by a sensor. The gesture identifier may be associated with a change in the first range of values for the first filter of the first set of one or more filters, or a change in database data metadata used to define, at least in part, the data visualization. Configuration data for the gesture identifier may be accessed to determine an action, and one or more parameters associated with the gesture identifier, for execution. The action may determine that a subset of the first range of values of the first filter is to be displayed, or different database data metadata is to be used to generate the data visualization, and the one or more parameters indicate at least in part the subset of the first range of values of the at least a first filter to be used to modify the data visualization.

The associated action may be executed using the one or more parameters. Executing the action may include generating an updated first set of filters based at least in part on the one or more parameters. Executing the action may further include retrieving a third set of database data defined by the updated first set of filters. Executing the action may also include generating a display of the retrieved third set of database data in the data visualization based at least in part on the updated first set of filters.

A process for manipulating displayed data is provided herein. A first set of database data may be defined based at least in part on a first set of one or more filters, and the database data may be associated with a plurality of fields and database data metadata. A first filter of the first set of one or more filters may define a first value or a first range of values for a first field of the plurality of fields associated with the first set of database data. The first set of database data may be retrieved from a database based at least in part on the first set of one or more filters or may be selected based at least in part on the first set of one or more filters of the first set of database data from a second set of database data retrieved from the database. A display of a data visualization for the first set of database data may be generated.

A gesture identifier may be received indicating a display control gesture was received by a sensor. The gesture identifier may be associated with accessing one or more options manipulating for the data visualization or displayed data set. Configuration data for the gesture identifier may be accessed to determine an action, and one or more parameters associated with the gesture identifier, for execution. The action may determine the one or more options for manipulating the data visualization or displayed data set.

The associated action may be executed using the one or more parameters. Executing the action may include accessing configuration data for the data visualization to determine one or more options associated with the data visualization. Executing the action may also include displaying the one or more options for the data visualization and the displayed data set in the data visualization based on the action and the one or more associated parameters.

The foregoing and other objects, features, and advantages of the invention will become more apparent from the following detailed description, which proceeds with reference to the accompanying figures.

DETAILED DESCRIPTION

Figure 1:
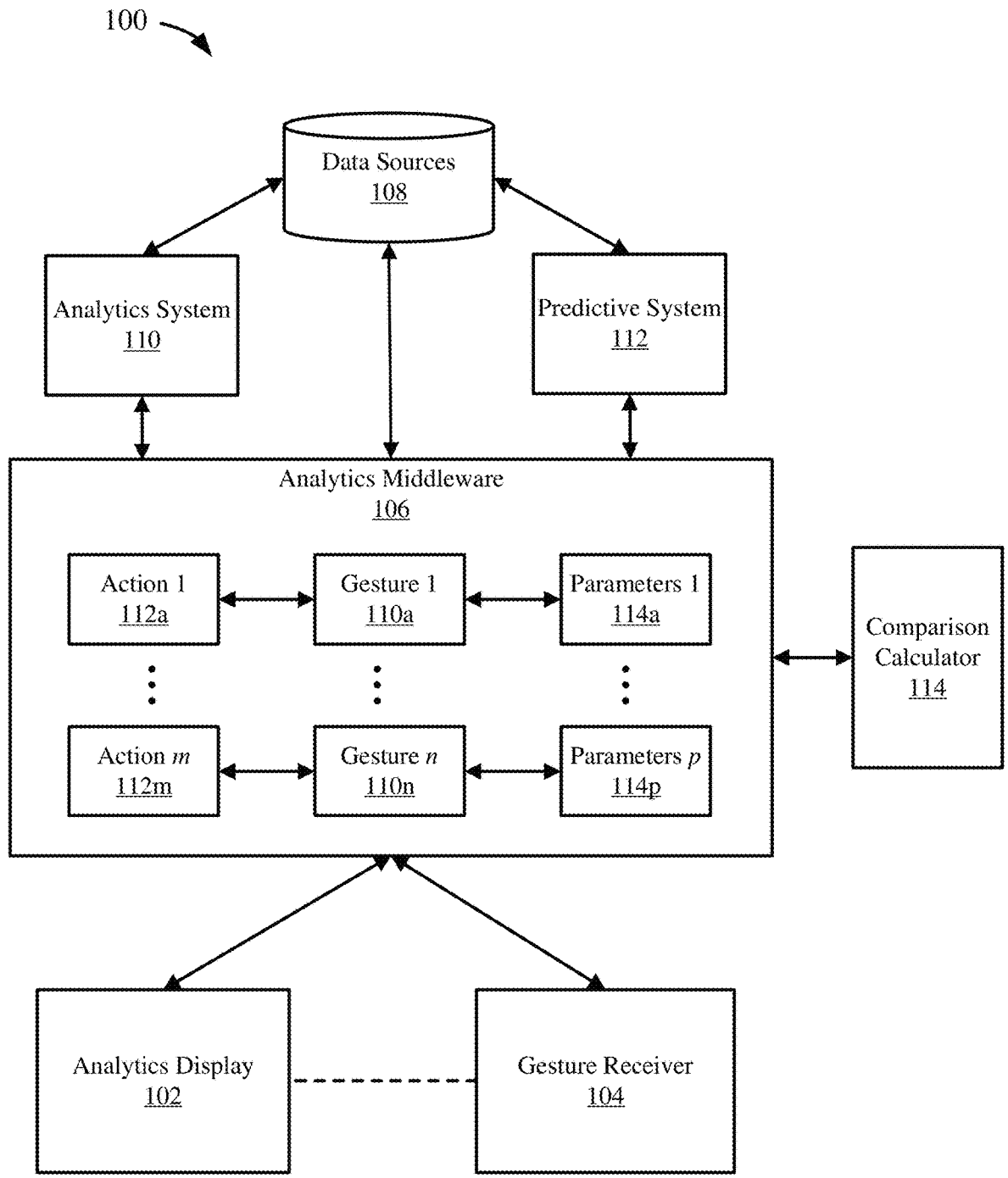
FIG. 1 is a schematic diagram depicting an architecture for gesture-based UI controls.

A variety of examples are provided herein to illustrate the disclosed technologies. The technologies from any example can be combined with the technologies described in any one or more of the other examples to achieve the scope and spirit of the disclosed technologies as embodied in the claims, beyond the explicit descriptions provided herein. Further, the components described within the examples herein may be combined or recombined as well, as understood by one skilled in the art, to achieve the scope and spirit of the claims.

Example 1—Gesture-Based Data Analytics UI Controls Overview

Users of data analytics systems generally want to view or compare data, to draw actionable insights, quickly and easily. Often this includes performing visual comparisons between related categories of data. This process of analyzing data by a user often involves multiple clicks or input selections by the user for identifying and selecting relevant categories of data and generating the plethora of charts to make such comparisons. The selection of input is often cumbersome and slow, and the on-screen widgets and artifacts for making the selections and presenting the data use valuable display space (e.g. drop-downs for selecting data, action buttons for activating chart features, etc.).

The input mechanisms and user-interface (UI) controls for charts and other spreadsheets are often particularly slow and cumbersome for users trying to concurrently display or review many different data sets. The same inputs must often be selected or repeated across multiple charts or data sets, which further slows down the process of analyzing data and discovering actionable insights. Additionally, these steps often do not translate to multiple devices or user experiences.

Touch-native, gesture-based UI controls as disclosed herein can alleviate many of these concerns and make traversing data across multiple data sets faster, easier, and more intuitive. Further, touch-native gesture UI controls can help provide a consistent UI for users across multiple different platforms, including touch-screens, virtual reality, motion-detection, or augmented reality, including through spatial sensors or optical sensors. Touch-native gesture-based UI controls may be UI controls that are generally not skeuomorphic. Many users now have mobile computing devices which provide touch-screen functionality, which may be coupled to other computing systems or devices to be used as the input interface while displaying data on a larger screen or accessing a remote data analytics system. Thus, the UI may remain consistent for a user, and be physically manipulable by the user, while the data analytics system may be decoupled and may be provided to users remotely by accepting the UI inputs from the mobile device. That is, the user device may render displays generated by a remote data analytics system, or using data (including summary data) provided by the remote data analytics system. In further cases, the mobile device may act as a remote control for displays generated by or displayed on another computing device.

Gesture interactions with data analytics, such as touch-native UI controls, often make interacting with the data under analysis faster and more intuitive by allowing the natural gestures of users to transform data or data visualizations or presentations. Such gestures and transformations are described herein. Accordingly, generally a user may spend less time generating visualizations and analyzing a data set when using gesture UI controls, thus arriving at decisions faster, by reducing the number of cumbersome or inefficient UI steps. Users may also generally find the gesture UI controls more intuitive, and so learn how to manipulate a data analytics system faster, and make better use of the analytics system. The gesture-based UI controls allow for the removal of many standard UI controls from the display, such as drop-down menus or toolbars, thus freeing up limited display area for showing more data or more detailed data visualizations. Or, such standard UI controls can be displayed when requested by a gesture-based UI control. In some cases, the touch-native, gesture UI controls described herein may function or be implemented as user interactions (UX).

Examples of data analytics systems or enterprise resource planning systems that may use gesture UI controls as described herein are: SAP BusinessObjectsCloud™, Fiori™, and SAP Digital Boardroom™, all of SAP SE of Walldorf, Germany.

Example 2—Gesture UI Control Architecture

FIG. 1 is a schematic diagram depicting an architecture 100 for gesture UI analytics controls. An analytics middleware system 106 may communicate with an analytics display 102 and a gesture receiver 104. In some embodiments, the analytics middleware 106 may be integrated with the analytics display 102, the gesture receiver 104, or both. The analytics middleware 106 may access or communicate with an analytics system 110. In some embodiments, the analytics middleware 106 may be integrated with the analytics system 110. The analytics middleware 106 may access or communicate with one or more data sources 108. The data sources 108 may be remote or local data sources, and may be databases, data files, or other data storage structures. Additionally or alternatively, the data sources 108 may be offline data sources (e.g. a remote file copied and stored locally for the analytics middleware 106). In some embodiments, one or more of the data sources 108 may be integrated with the analytics middleware 106.

The analytics system 110 may provide data analytics functionality to the analytics middleware 106 (which may then be displayed via the analytics display 102 or manipulated via the gesture receiver 104 as described herein). The analytics system 110 may access or otherwise communicate with the data sources 108. In some embodiments, the analytics system 110 may be integrated with one or more data sources 108. Alternatively or additionally, the analytics system 110 may be integrated with the analytics middleware 106. Alternatively or additionally, the analytics system 110 may be integrated with the predictive system 112. In some embodiments, the analytics middleware 106 may be integrated as a plug-in for the analytics system 110. Example analytics systems may be Excel™, from Microsoft of Redmond, Wash., BusinessObjectsCloud™, from SAP SE, of Walldorf, Germany, or Google Docs™ from Google of Mountain View, Calif.

The analytics middleware 106 may function both online, such as across a network in communication with the other systems 110, 112, 114 or data sources 108, or offline, such as when the relevant systems or data sources are available locally for the analytics middleware. In some embodiments, the analytics middleware 106 may act as an interpreter between the gesture receiver 104 and the analytics system 110, providing enhanced gesture-based UI controls to analytics systems. In such embodiments, the analytics middleware 106 may translate or map the gesture UI controls described herein to analytics functionality, in some cases at least in part using the actions 112a-m or parameters 114a-p, or a combination thereof.

The analytics display 102 may display data visualizations of data sets, as provided by the analytics middleware 106 or the analytics system 110. The gesture receiver 104 may be a user interface for the analytics middleware 106 or analytics system 110. The gesture receiver 104 may receive gesture UI control commands, as described herein, and provide the commands to the analytics middleware 106 for processing. Gesture UI controls may manipulate data within the analytics system, such as by changing the visualization of a data set or changing which data set to visualize.

At least a portion of the gesture receiver 104 may be independent of a gesture provider (e.g., a finger or other body part, or a pointing device, such as a wand or stylus). That is, the gesture provider is generally not physically integrated with the gesture receiver 104. Further, a gesture receiver 104 detects gestures at least in part by detecting movement of the gesture provider relative to the gesture receiving, such as movement of a finger relative to a capacitive touchscreen or relative to a camera. A gesture receiver 104, which can be the same gesture receiver or a different gesture receiver, can receive other signals to help detect gestures, such as positional information transmitted by an inertial measurement unit or similar sensors that are located in, or coupled to, the gesture provider.

The gesture receiver 104 may be integrated with the analytics display 102. For example, the gesture receiver 104 may be integrated with the analytics display 102, as a touch screen. In other embodiments, the gesture receiver 104 may be a motion receiver, which can be integrated in the analytics display 102 or in electronic communication with the analytics display, that detects user motions in a given spatial region, for example as a touchless user interface (TUI) or semi-touchless such as with a controller. In other embodiments, the gesture receiver 104 and the analytics display 102 may be virtual reality or augmented reality systems. Generally, disclosed technologies can be implemented by mapping particular input signals (as may be generated or determined in the gesture receiver 104) to particular actions, and such mapping can be configurable.

The gesture receiver 104 may detect gesture UI controls made by a user. A gesture UI control may be a gesture made by a user, such as with a hand or a tool in some cases, such as gesture with a wand or controller. A gesture may be a motion made by a user. The motion may have defining characteristics (e.g. speed, direction, tap or other action), which may be used by a gesture receiver 104 to identify the motion as a particular gesture (rightward swipe, single tap, hold, etc.). A gesture is distinguished from other pointing actions by not being tied to a specific location of a user interface. That is, a pointing action, such as a button select, is intended to associate user input with a specific, displayed UI control. In contrast, a gesture provides UI interaction with activating a specifically displayed UI control. A gesture is generally received by a comparatively large portion of a user interface (e.g., an entire touchscreen surface, or one of a plurality of defined zones of the surface), or is independent of a user interface. For example, a user may make a swiping motion with their finger that is detected by a gesture receiver 104, and the gesture need not have any particular relation to a UI being displayed. Or, in the case of a touchscreen, the touchscreen may display the UI, but the gesture action may not be to activate any particular control being displayed on the UI.

The analytics middleware 106 may recognize one or more gesture UI controls, such as gestures 1-n 110a-n. The gestures 110a-n may be received from the gesture receiver 104, generally as coded inputs. A gesture 110a-n may be associated with one or more actions 112a-m, which one or more actions can depend on a particular context, such as a particular portion or zone of the display through which a gesture was received, or based on one or more other prior gestures, user input, or other parameters. An action 112a-m may specify a particular transformation, such as described herein. A transformation may change the data set being visualized, the data visualization, or the display itself (e.g. open a menu, etc.). For example, an action may be to change the value of one of the variables defining a visualized data set. An action may indicate, for a data set showing information for the current year, to change the data set to show similar information for the previous year (or the next year, etc.).

A gesture 110a-n may be associated with one or more parameters 114a-p. A parameter 114a-p may also be associated with the action 112a-m for the associated gesture 110a-n. A parameter 114a-p may help define the functionality of its corresponding gesture 110a-n, or for its corresponding action 112a-m, or both. Continuing the previous example, a parameter 114a-p may define how to change the value of a variable when changing the visualized data set. For example, a parameter may indicate to change the time to next year for a data set, or the parameter may indicate to shift the data set by one month, or to increase the data set by one year or one month, and so on. Parameters 114a-p may also indicate how to visualize data, such as by month or by year or by data point (to continue the example). Parameters 114a-p may also indicate if the gesture is active or inactive (functional or not) for a particular zone or region of the gesture receiver, as described herein.

Generally, the parameters 114a-p may be user configurable. Further, the association between a gesture 110a-n and an action 112a-m may be user configurable. In some embodiments, the same gesture may be associated with different actions based on different parameters (e.g. the same gesture may have different functions in different zones of the UI, or the same gesture may have different functions in different scenarios defined by the parameters).

The analytics middleware 106 may access or otherwise communicate with a predictive system 112. The predictive system 112 may be a software system or service accessible through an API, or may be integrated with the analytics middleware 106 or the analytics system 110 (or both). The predictive system 112 may be accessed to obtain data that is not otherwise available, such as in the data sources 108. For example, a user may swipe to show a data set (e.g. into a dimension or range for a dimension) for which no actual data is available in a data source 108. The predictive system 112 may then be accessed to provide or generate data for the requested data set. For example, a request to show data for a future year may be made to the analytics middleware 106 (e.g. through the gesture receiver 104) and no data may be available for that future year. The predictive system 112 may then supply generated, predicted data for the future year. The predictive system 112, may have logic for generating predicted data, such as trained machine-learning or heuristic algorithms, which may generate forecasted data. The predictive system 112 may access one or more data sources 108 for use in generating the predicted data. In some embodiments, the predictive system 112 may store previously generated predicted data, which it may provide when requested. Additionally or alternatively, the predictive system 112 may generate the predicted data on-the-fly. Example predictive systems may be Apache Spark™ or Apache Hadoop™ both from the Apache Software Foundation, of Wakefield, Mass.

The analytics middleware 106 may access or otherwise communicate with a comparison calculator 114. The comparison calculator 114 may be a software system or service accessible through an API, or may be integrated with the analytics middleware 106. The comparison calculator 114 may provide logic for comparing two data sets, such for a data presentation or visualization as described herein, which may generally include calculating a difference between the data sets. For example, the comparison calculator may provide the logic for overlaying one data set with another data set. In some cases, calculating the difference between data sets may include subtraction between comparable values in the data sets. In other cases, calculating the difference between data sets may include calculating the root mean squared error between two data sets. In some embodiments, the comparison calculator may include trained machine-learning algorithms for calculating the difference between two data sets. Other formulae or rules may be used to calculate the difference between data sets, as well. The comparison calculator 114 may return the relevant difference values calculated for the comparable values between data sets.

The comparison calculator 114 may store or maintain the logic or formulae for calculating the comparison between data sets. The comparison calculator 114 may store such formulae locally or remotely, such as in a database.

Example 3—Display and Gesture Zones

Figure 2A:
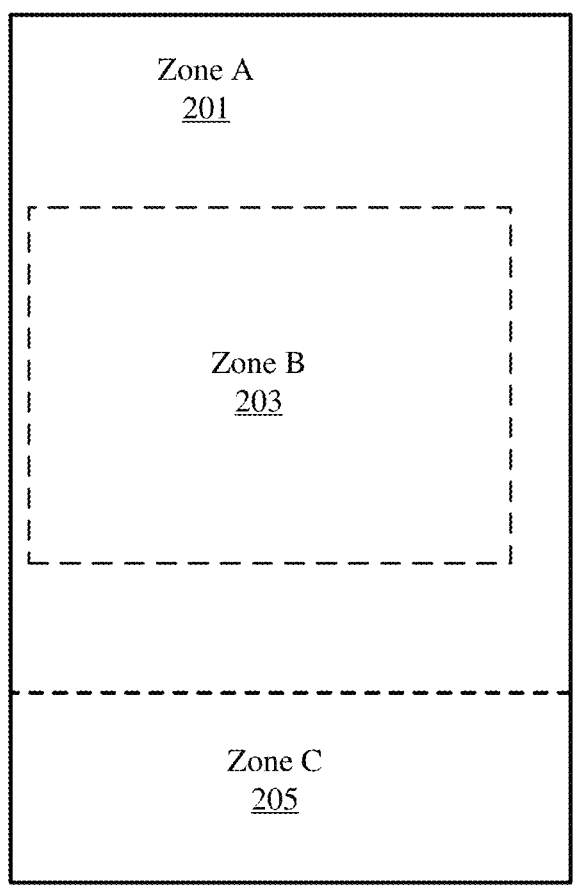
FIG. 2A is a diagram depicting an arrangement of zones in a user interface.

FIG. 2A is a diagram depicting an arrangement of zones in a user interface 200. The user interface 200 may be divided into multiple zones, such as Zone A 201, Zone B 203, and Zone C 205. The user interface 200 may be combined with or relate to a display (e.g., the analytics display 102 of FIG. 1), as described herein. The different zones 201, 203, 205 may be associated with different gesture UI controls (or other UI controls). For example, a swipe gesture UI control may be associated with Zone B 203, and so be functional within Zone B, but not the other zones 201, 205. Additionally or alternatively, the available gesture UI controls may be associated with different actions and parameters in the different zones 201, 203, 205. For example, a tap gesture UI control may open one menu in Zone B 203, while opening a different menu in Zone C 205. Thus, gesture UI controls and their associated actions and parameters may be further defined by one or more associated zones. An associated zone for a gesture UI control may be a parameter as shown in FIG. 1.

Zones 201, 203, 205 may be spatial divisions of the user interface or display. In some embodiments, the zones 201, 203, 205 may relate to widgets or other software artifacts displayed or underlying in the interface. For example, Zone B 203 may be a widget displaying a graph or other data visualization, while Zone A 201 is defined by the space around the widget and the edges of a display and Zone C 205 is defined by a system menu. Thus, the displayed graph or chart (e.g. Zone B 203) may be identified and associated with certain gesture UI controls while the remaining space around it (e.g. Zone A 201) is not associated with those gesture UI controls. In general, zones may be discrete, may overlap, or a display to be rendered can have a combination of such zones, or an input device (e.g., a capacitive touchpad or touchscreen) can be divided into zones that can optionally be independent of any particular display being rendered.

Multiple data presentations or visualizations (e.g. charts) may be displayed using zones 201, 203, 205. For example, a first data presentation may be displayed in ("zone" was previously capitalized) Zone B 203 and a second data presentation may be displayed in zone D (not shown), which may be similar to Zone B and placed within Zone A 201, but requires scrolling through Zone A to become visible. Additional data presentations may be similarly provided through additional zones. In such cases, UI gestures (e.g. swiping up/down or right/left) may be used to scroll through Zone A 201 to make additional data presentations, such as the second presentation in Zone D, visible, while swiping on the data presentations in Zone B 203 or Zone D may alter the data presentations as described herein.

In other multiple data presentation embodiments, switch or other widget may be provided, such as in Zone A 201, to alter the gesture UI input context. Such a switch may allow for scrolling through data presentations (e.g. when in an "off" position), such as displayed in Zone B 203 and Zone D, while deactivating gesture UI controls for Zones B and D. When the switch is altered (e.g. pressed or tapped, such as to an "on" position), it may alter the input context by disabling scrolling (e.g. in Zone A 201) and activating gesture UI control for the data presentations in Zone B 203 and Zone D (or other data presentations in other zones that are now visible). In some embodiments, each data presentation (e.g. Zone B 203, Zone D) may have a separate switch for changing the input context of that data presentation in its zone.

Multiple zones (e.g. 203) for displaying data presentations may be arranged vertically, horizontally, or both, such as in a grid. Such arrangements may be set by default, or may be user-configurable, or may be responsive to the type of device displaying the multiple data presentations, such as by reformatting a 4×4 grid of data presentations for a tablet device to a 16×1 vertical arrangement for a smaller mobile device.

Figure 2B:
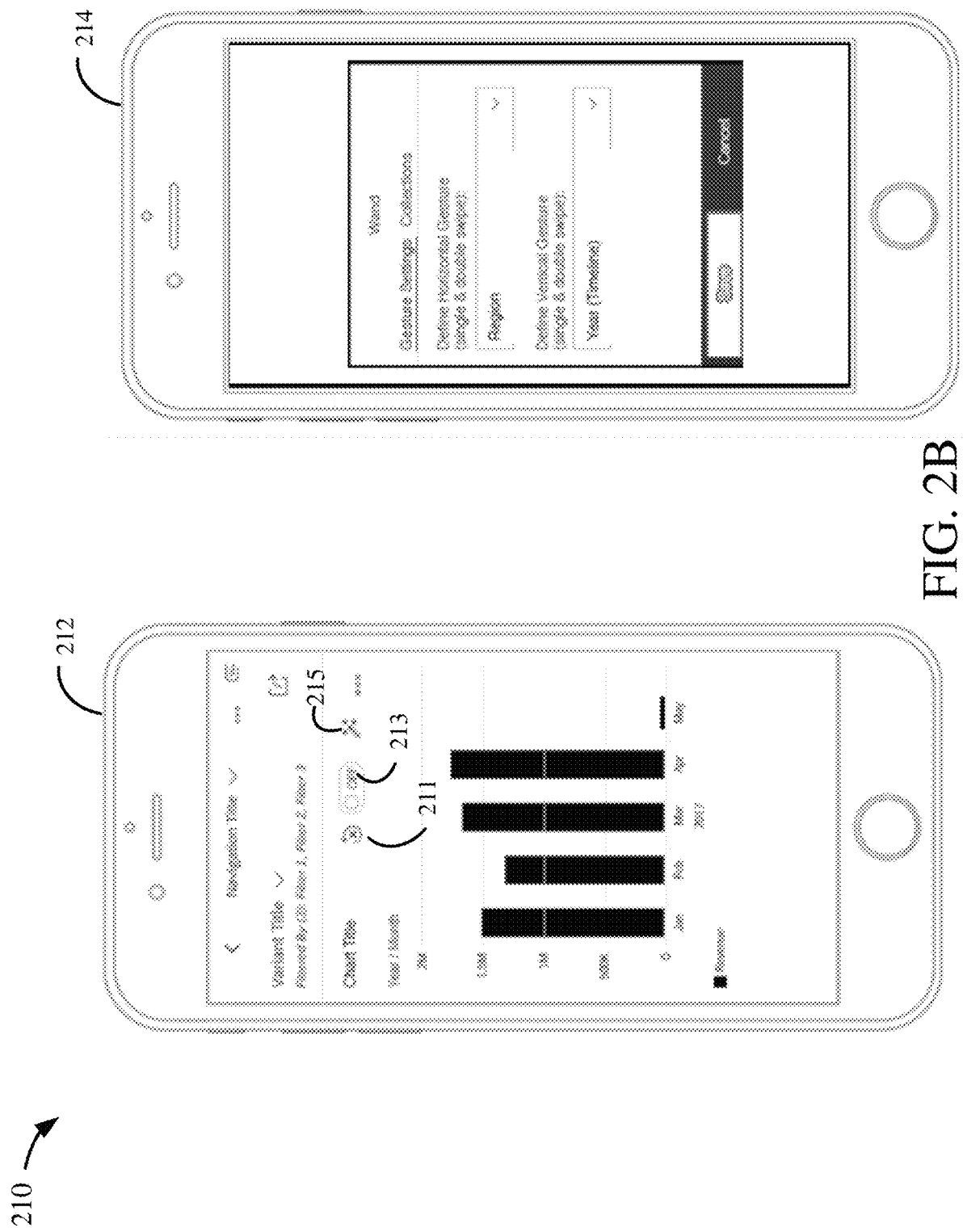
FIG. 2B is an example data presentation and setting menu presentation.

FIG. 2B is an example 210 data presentation 212 and setting menu display 214. The data presentation 212 may display a data visualization of a data set defined by one or more dimensions. A dimension may be a filter, such as a search or query filter, a variable, or, in some cases, may be equated to an axis. For example, a dimension may be a year or date dimension (e.g. shown in the data presentation 212 along the x-axis), another dimension may be sales revenue (e.g. shown in the data presentation along the y-axis), and another may be a region dimension (e.g. shown in the title of the data presentation). Measures may be dimensions which are quantitative in nature, and so are generally numerical values which can be manipulated with mathematical functions. For example, sales revenue may be a measure. The data displayed may be the cross product of the dimensions, such as a tuple set of dimensions {2017, sales, Africa} (where sales may be a measure). A given data point used in rendering the data presentation 212 may be defined by a tuple (which may be an ordered tuple) of the dimensions, such as {May 2017, 100 k sales, Africa}. A change to a dimension may change the tuple set defining the data presentation, such as changing {2017, sales, Africa} to {2018, sales, Africa} or {2017, sales, Europe}. Generally, the unchanging dimension may be a measure for the data presentation. In some embodiments, a measure may not be configurable to be manipulated (e.g. by a gesture UI control). A data presentation based on multiple dimensions may have no measures, one measure, or multiple dimensions that are measures.

The data presentation 212 may have a home or reset button 211 which may be used to return to a starting data presentation, as described herein. The data presentation 212 may have a switch or toggle button 213 which may be used to alter the input context for the gesture UI controls, as described herein, such as to turn on or off the described UI controls. In some embodiments, the data presentation 212 may have a button, similar to the home button 211 or the toggle button 213, which may activate a data presentation displaying all the data for a given data set (e.g. all sales revenue). Such a button may provide backward compatibility functionality for users which prefer full data displays.

The data presentation 212 may have a configuration button 215 which may be used to access user-configurable options, as described herein, such as associating a dimension to a gesture UI control. Generally, once a dimension is associated with a particular gesture UI control, it is not available to be associated with a different gesture UI control until disassociated from the first gesture. The configuration button 215 may open a configuration menu shown in presentation 214, which may alternatively or additionally be accessed through a context menu as described herein. Configuration options for different gesture UI controls may be visually deemphasized (e.g. "grayed out") when not available, such as when only one or two dimensions are used in the data presentation. Dimensions that have already been associated may be removed from availability for other gesture UI controls. In some cases, measures may not be available for associating with gesture UI controls, or specific gesture UI controls. In such cases, a measure may not be manipulable through the gesture UI controls described.

The buttons 211, 213, 215 may remain available through data presentation transformations, as described herein.

Example 4—Swipe-Single UI Control

Figure 3A:
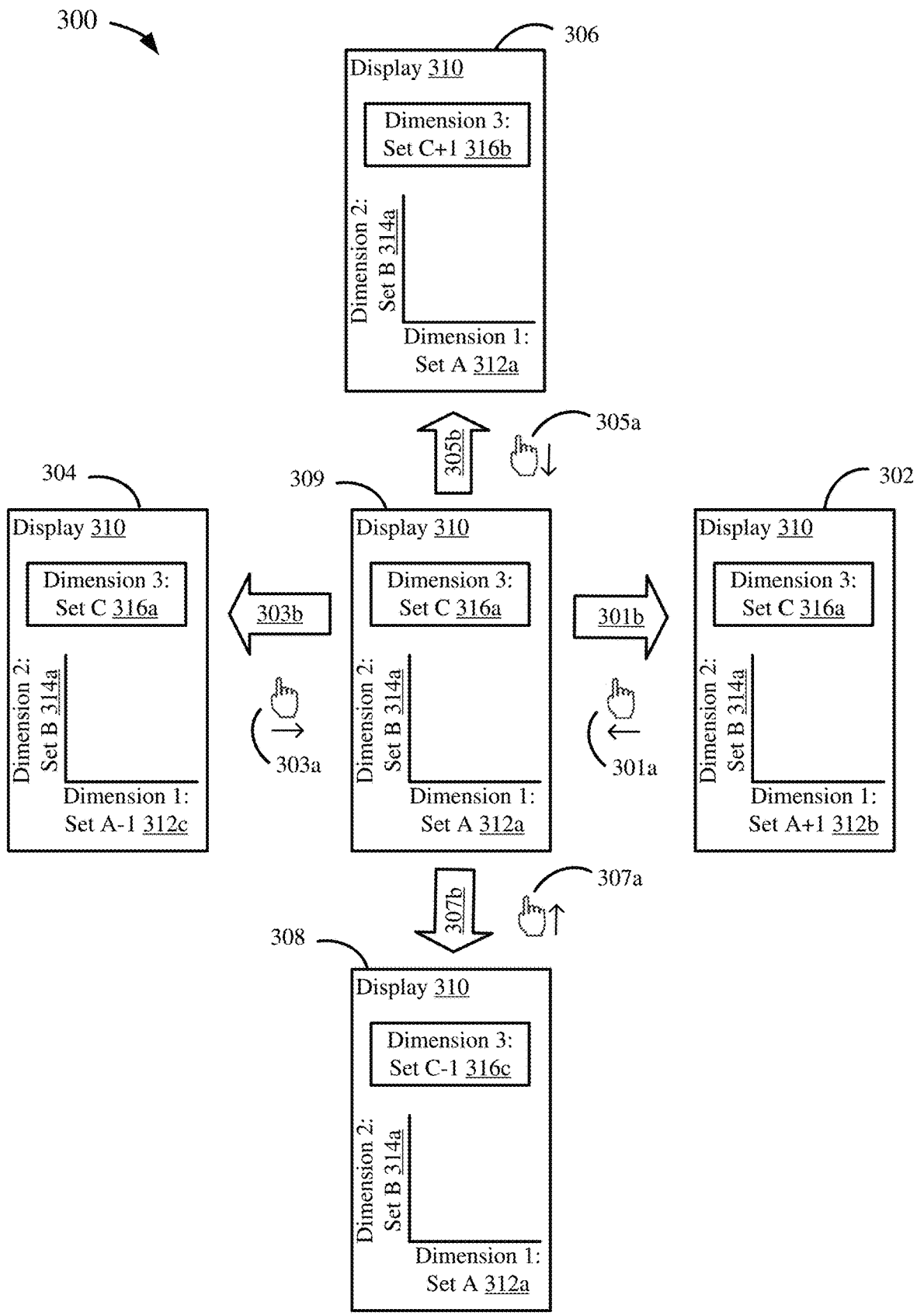
FIG. 3A illustrates data presentation transformations based on swipe-single gestures.

FIG. 3A illustrates data presentation transformations 300 based on swipe-single gestures. A first data presentation 309 may be provided in a display 310. The data presentation 309 may visualize a data set defined by three dimensions (e.g. axes or search filters) 312a, 314a, 316a. The different dimensions 312a, 314a, 316a may define the data displayed based on the possible values for the dimensions, or a selected value(s) for the dimensions. For example, the data presentation 309 may only visualize data for values in set A along dimension 1 312a. Similarly, the data presentation 309 may only visualize data for values in set B for dimension 2 314a, and for values in set C for dimension 3 316a. More or fewer dimensions may be used in the data presentation 309. The data presentation 309 may provide the data in a graph form, as similarly shown, or other data visualization, such as a table or chart. For example, the data presentation 309 may visualize total sales (along dimension 2 314a) for the current year, such as by month, (along dimension 1 312a) for the region of Africa (along dimension 3 316a).

A swipe-single to the left gesture 301a may initiate transformation 301b that changes data presentation 309 to data presentation 302. The leftward swipe-single gesture 301a may have associated parameters that indicate which dimension to alter, and in what manner to alter it. The transformation 301b may change the data set used along dimension 1 to set A+1 312b. The new data set presented in data presentation 302 may be in part defined by dimension 1 data set A+1 312b, which may be a change to dimension 1 (e.g. in a tuple defining the data presentation 302), such as a new range of values for dimension 1 compared to the values for dimension 1 in data set A 312a or the next discrete value in a list of values for dimension 1. The change to dimension 1 may be defined by parameters associated with the leftward swipe-single gesture. For example, the data presentation 302 may show sales data (the unchanged dimension 2 314a) in the next year (the changed dimension 1 set A+1 312b) for the region of Africa (the unchanged dimension 3 316a). This example may include the tuple defining the data presentation 302 of {2019, sales, Africa} may change to {2020, sales, Africa} (the data presentation may be re-rendered in response to the dimension change). As another example, the leftward swipe-single gesture 301a changes the data presentation 309, showing data for dimension 1 values 10-19, to show the next data set based on dimension 1, dimension 1 values 20-29, in data presentation 302. Thus, the leftward swipe-single gesture 301a may transform 301b the data presentation 309 to the data presentation 302 based on a change to the data set shown in dimension 1 312b.

A swipe-single to the right gesture 303a may initiate transformation 303b that changes data presentation 309 to data presentation 304. The rightward swipe-single gesture 303a may have associated parameters that indicate which dimension to alter, and in what manner to alter it. The transformation 303b may change the data set used along dimension 1 to set A−1 312c. The new data set presented in data presentation 304 may be in part defined by dimension 1 data set A−1 312c, which may be a change to dimension 1 (e.g. in a tuple defining the data presentation 302), such as a new range of values for dimension 1 compared to the values for dimension 1 in data set A 312a or the next discrete value in a list of values for dimension 1. The change to dimension 1 may be defined by parameters associated with the rightward swipe-single gesture. For example, the data presentation 304 may show sales data (the unchanged dimension 2 314a) in the previous year (the changed dimension 1 set A−1 312c) for the region of Africa (the unchanged dimension 3 316a). This example may include the tuple defining the data presentation 302 of {2019, sales, Africa} may change to {2018, sales, Africa} (the data presentation may be re-rendered in response to the dimension change). As another example, the rightward swipe-single gesture 303a changes the data presentation 309, showing data for dimension 1 values 10-19, to show the previous data set based on dimension 1, dimension 1 values 0-9, in data presentation 304. Thus, the rightward swipe-single gesture 303a may transform 303b the data presentation 309 to the data presentation 304 based on a change to the data set shown in dimension 1 312c.

Generally, the leftward swipe-single gesture 301a may increment dimension 1 312a up, to dimension 1 312b. Generally, the rightward swipe-single gesture 303a may decrement dimension 1 312a down, to dimension 1 312c. Actual data presented in the data presentations 302, 304, 309 may change accordingly, in response to the change to dimension 1 312a-c.

A swipe-single downward gesture 305a may initiate transformation 305b that changes data presentation 309 to data presentation 306. The downward swipe-single gesture 305a may have associated parameters that indicate which dimension to alter, and in what manner to alter it. The transformation 305b may change the data set used along dimension 3 to set C+1 316b. The new data set presented in data presentation 306 may be in part defined by dimension 3 data set C+1 316b, which may be changed to dimension 3 (e.g. in a tuple defining the data presentation 302), such as a new value(s) for dimension 3 compared to the value(s) for dimension 3 in data set C 316a. The change to dimension 3 may be defined by parameters associated with the downward swipe-single gesture. For example, the data presentation 306 may show sales data (the unchanged dimension 2 314a) in the current year (the unchanged dimension 1 312a) for the region of Europe (the changed dimension 3 C+1 316b). This example may include the tuple defining the data presentation 302 of {2019, sales, Africa} may change to {2019, sales, Europe} (the data presentation may be re-rendered in response to the dimension change). As another example, the downward swipe-single gesture 305a changes the data presentation 309, showing data for dimension 3 value 3, to show the next data set based on dimension 3, dimension 3 value 4, in data presentation 306. Thus, the downward swipe-single gesture 305a may transform 305b the data presentation 309 to the data presentation 306 based on a change to the data set shown in dimension 3 316b.

A swipe-single upward gesture 307a may initiate transformation 307b that changes data presentation 309 to data presentation 308. The upward swipe-single gesture 307a may have associated parameters that indicate which dimension to alter, and in what manner to alter it. The transformation 307b may change the data set used along dimension 3 to set C−1 316c. The new data set presented in data presentation 308 may be in part defined by dimension 3 data set C−1 316c, which may be changed to dimension 3 (e.g. in a tuple defining the data presentation 302, such as a new value(s) for dimension 3 compared to the value(s) for dimension 3 in data set C 316a. The change to dimension 3 may be defined by parameters associated with the upward swipe-single gesture. For example, the data presentation 308 may show sales data (the unchanged dimension 2 314a) in the current year (the unchanged dimension 1 312a) for the region of Asia (the changed dimension 3 C−1 316c). This example may include the tuple defining the data presentation 302 of {2019, sales, Africa} may change to {2019, sales, Asia} (the data presentation may be re-rendered in response to the dimension change). As another example, the upward swipe-single gesture 307a changes the data presentation 309, showing data for dimension 3 value 3, to show the previous data set based on dimension 3, dimension 3 value 2, in data presentation 308. Thus, the upward swipe-single gesture 307a may transform 307b the data presentation 309 to the data presentation 308 based on a change to the data set shown in dimension 3 316c.

Generally, the downward swipe-single gesture 305a may increment dimension 3 316a up, to dimension 3 316b. Generally, the upward swipe-single gesture 307a may decrement the dimension 3 316a down, to dimension 3 316c. Actual data presented 306, 308, 309 may change accordingly, in response to the change to dimension 3 316a-c. Similarly, dimension 2 314a may be associated with the upward or downward swipe-single gestures 305a, 307a, such as in place of dimension 3 (or, alternately, in place of gestures described as altering dimension 1). Other dimensions may be associated with the swipe-single gestures 301a, 303a, 305a, 307a as well, which may be user configurable. If desired, swipe-single gestures can be mapped to changes in multiple dimensions, such as incrementing or decrementing both dimension 1 and dimension 2.

A swipe-single gesture may be a motion performed with a single extended finger or electronic input device (e.g. wand, stylus, controller, etc.), generally moving either horizontally or vertically from a single point to another, that is detectable by a gesture input receiver, such as shown in FIG.

1. If performed with an electronic device, such a device may have a button or other mechanism for indicating a swipe-single. The swipe-single gestures generally allow a user to traverse through large or multiple data sets quickly and easily, using an intuitive action.

Figure 3B:
FIGS. 3B-C are examples illustrating data presentation transformations based on swipe-single gestures.

FIG. 3B is an example illustrating data presentation transformations 320 based on swipe-single gestures. A home or starting data presentation 322 may display revenue data for a year (2019) in a region (Africa). The home data presentation 322 may be transformed to data presentation 324 with a rightward swipe-single gesture, which may change the Africa revenue data displayed from the year 2019 to the previous year 2018 (e.g. a change along a time or year dimension). The home data presentation 322 may be transformed to data presentation 326 with a leftward swipe-single gesture, which may change the Africa revenue data displayed from the year 2019 to the next year 2020 (e.g. a change along a time or year dimension), which may be predicted or forecasted data.

Figure 3C:
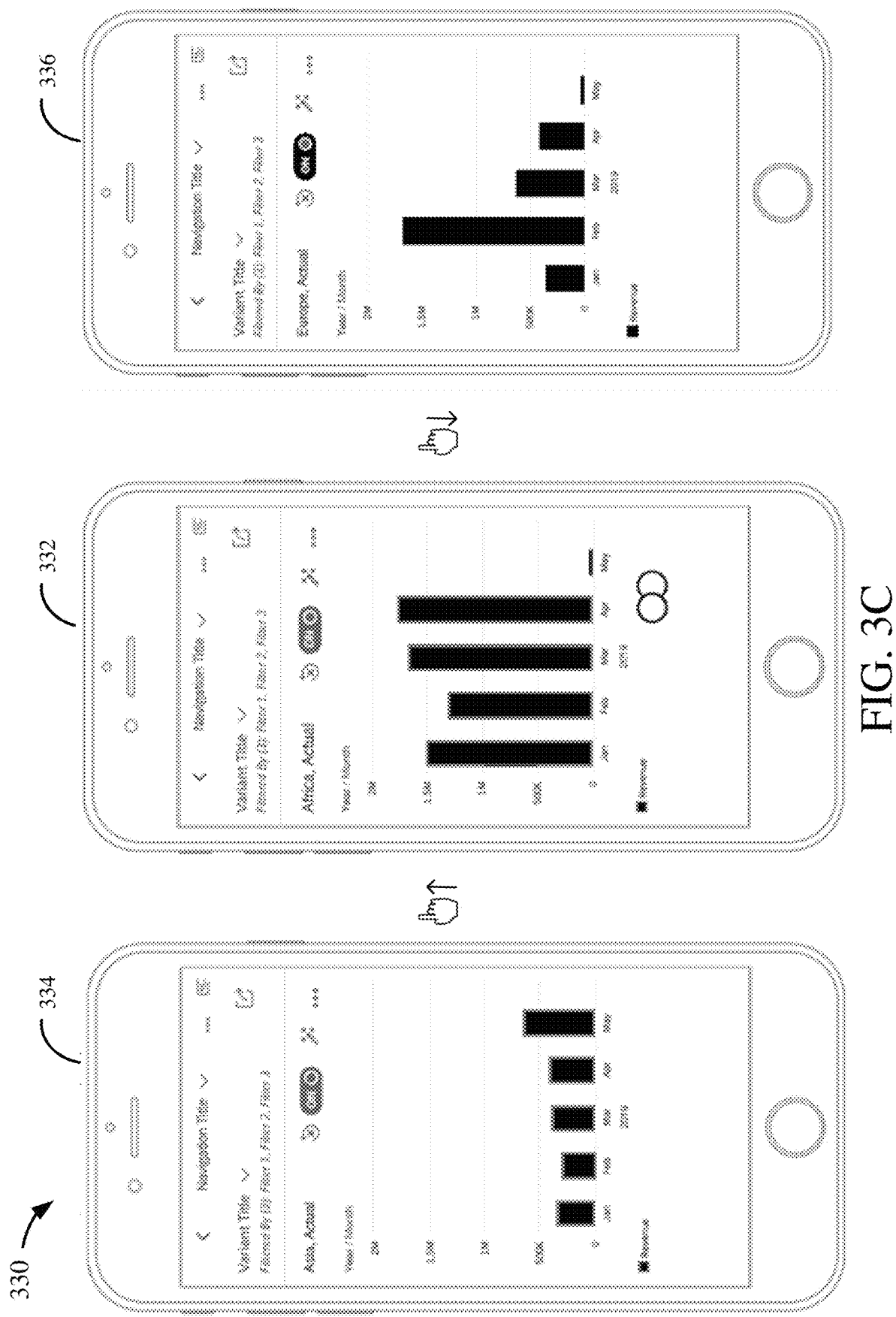

FIG. 3C is an example illustrating data presentation transformations 330 based on swipe-single gestures. A home or starting data presentation 332 may display revenue data for a year (2019) in a region (Africa), similar to the home data presentation 322 shown in FIG. 3B. The home data presentation 332 may be transformed to data presentation 334 with an upward swipe-single gesture, which may change the 2019 revenue data displayed from the Africa region to the previous region, Asia (e.g. a change along a region dimension). The home data presentation 332 may be transformed to data presentation 336 with a downward swipe-single gesture, which may change the 2019 revenue data displayed from the Africa region to the next region, Europe (e.g. a change along a region dimension).

Example 5—Swipe-Double UI Control

Figure 4A:
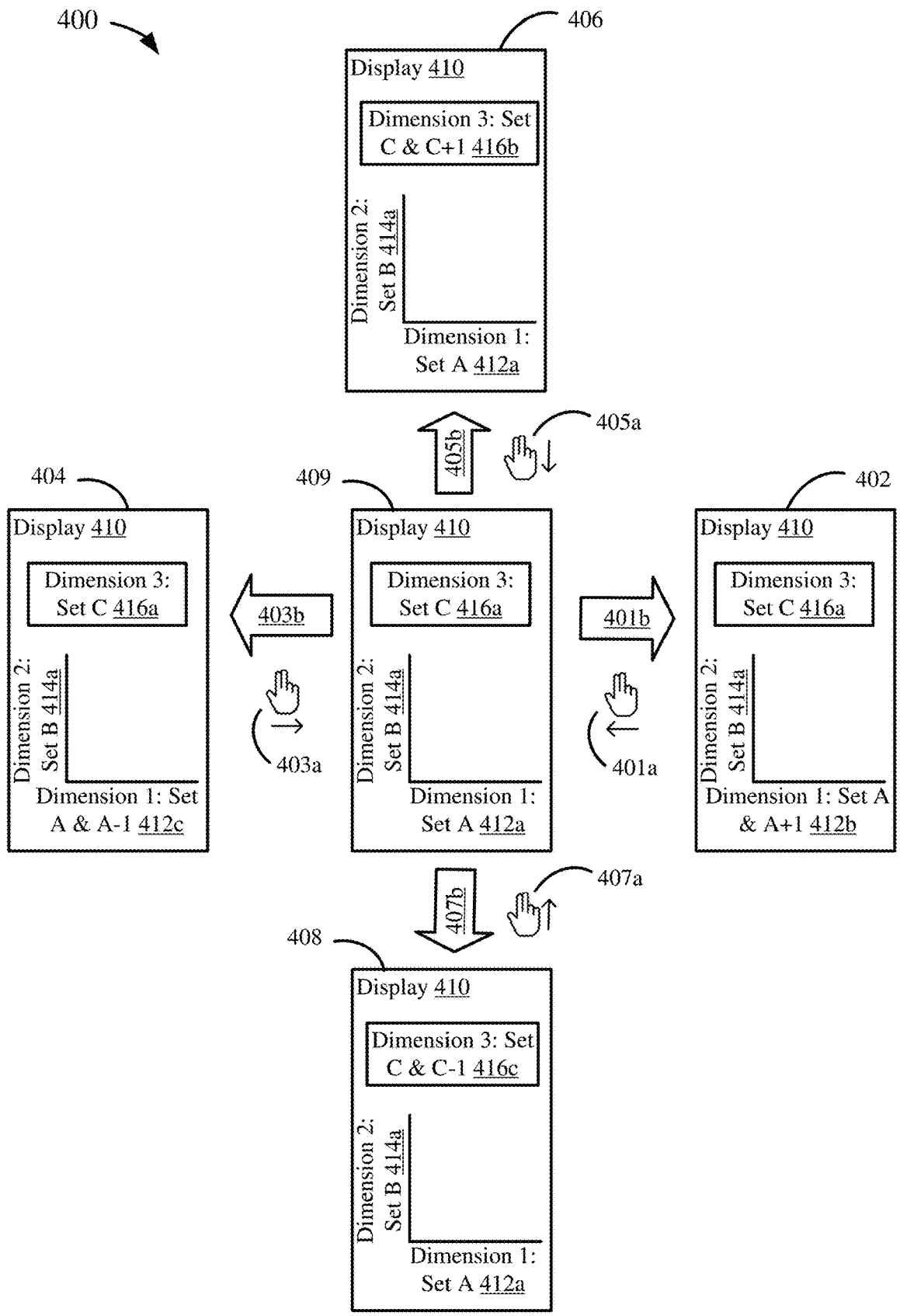
FIG. 4A illustrates data presentation transformations based on swipe-double gestures.

FIG. 4A illustrates data presentation transformations 400 based on swipe-double gestures. A first data presentation 409 may be provided in a display 410. The data presentation 409 may visualize a data set defined by three dimensions (e.g. axes or search filters) 412a, 414a, 416a. The different dimensions 412a, 414a, 416a may define the data displayed based on the possible values for the dimensions, or a selected value(s) for the dimensions. For example, the data presentation 409 may only visualize data for values in set A along dimension 1 412a. Similarly, the data presentation 409 may only visualize data for values in set B for dimension 2 414a, and for values in set C for dimension 3 416a. More or fewer dimensions may be used in the data presentation 409. The data presentation 409 may provide the data in a graph form, as shown, or other data visualization, such as a table or chart. For example, the data presentation 409 may visualize total sales (along dimension 2 414a) for the current year, such as by month, (along dimension 1 412a) for the region of Africa (along dimension 3 416a).

A swipe-double to the left gesture 401a may initiate transformation 401b that changes data presentation 409 to data presentation 402. The leftward swipe-double gesture 401a may have associated parameters that indicate which dimension to alter, and in what manner to alter it. The transformation 401b may change the data set used along dimension 1 to set A overlayed with set A+1 412b, thus displaying a comparison of two data sets together. The new data set overlayed in data presentation 402 may be in part defined by dimension 1 data set A+1 412b, which may be a change to dimension 1 (e.g. in a tuple defining the data presentation 402), such as a new range of values for dimension 1 compared to the values for dimension 1 in data set A 412a or the next discrete value in a list of values for dimension 1. The change to dimension 1 may be defined by parameters associated with the leftward swipe-double gesture. For example, the data presentation 402 may show sales data (the unchanged dimension 2 414a) in the next year overlayed along sales data for the current year (the changed dimension 1 set A overlayed by set A+1 412b) for the region of Africa (the unchanged dimension 3 416a). This example may include the tuple defining the data presentation 402 of {2019, sales, Africa} may be overlayed with the data (e.g. cross product) from the tuple changed to {2020, sales, Africa} (the data presentation may be re-rendered in response to the dimension change). As another example, the leftward swipe-double gesture 401a changes the data presentation 409, showing data for dimension 1 values 10-19, to overlay the next data set based on dimension 1, dimension 1 values 20-29, in data presentation 402. Thus, the leftward swipe-double gesture 401a may transform 401b the data presentation 409 to the data presentation 402 based on a change to the data set shown in dimension 1 412b.

A swipe-double to the right gesture 403a may initiate transformation 403b that changes data presentation 409 to data presentation 404. The rightward swipe-double gesture 403a may have associated parameters that indicate which dimension to alter, and in what manner to alter it. The transformation 403b may change the data set used along dimension 1 to set A overlayed with A−1 412c, thus displaying a comparison of two data sets together. The new data set overlayed in data presentation 404 may be in part defined by dimension 1 data set A−1 412c, which may be a change to dimension 1 (e.g. in a tuple defining the data presentation 402), such as a new range of values for dimension 1 compared to the values for dimension 1 in data set A 412a or the next discrete value in a list of values for dimension 1. The change to dimension 1 may be defined by parameters associated with the rightward swipe-double gesture. For example, the data presentation 404 may show sales data (the unchanged dimension 2 414a) in the previous year overlayed along sales data for the current year (the changed dimension 1 set A overlayed by set A−1 412c) for the region of Africa (the unchanged dimension 3 416a). This example may include the tuple defining the data presentation 402 of {2019, sales, Africa} may be overlayed with the data (e.g. cross product) from the tuple changed to {2018, sales, Africa} (the data presentation may be re-rendered in response to the dimension change). As another example, the rightward swipe-double gesture 403a changes the data presentation 409, showing data for dimension 1 values 10-19, to overlay the previous data set based on dimension 1, dimension 1 values 0-9, in data presentation 404. Thus, the rightward swipe-double gesture 403a may transform 403b the data presentation 409 to the data presentation 404 based on a change to the data set shown in dimension 1 412c.

Generally, the leftward swipe-double gesture 401a may overlay dimension 1 412a with the next dimension 1 data set up (increment), to dimension 1 412b. Generally, the rightward swipe-double gesture 403a may overlay dimension 1 412a with the next dimension 1 data set down (decrement), to dimension 1 412c. Actual data presented 402, 404, 409 may change accordingly, in response to the additional data from the addition of the change in dimension 1 412a-c.

A swipe-double downward gesture 405a may initiate transformation 405b that changes data presentation 409 to data presentation 406. The downward swipe-single gesture 405a may have associated parameters that indicate which dimension to alter, and in what manner to alter it. The transformation 405*b* may change the data set used along dimension 3 to set C overlayed with set C+1 416*b*, thus displaying a comparison of two data sets together. The new data set overlayed in data presentation 406 may be in part defined by dimension 3 data set C+1 416*b*, which may be a new value(s) for dimension 3 compared to the value(s) for dimension 3 in data set C 416*a* (e.g. in a tuple defining the data presentation 402). The change to dimension 3 may be defined by parameters associated with the downward swipe-double gesture. For example, the data presentation 406 may show sales data (the unchanged dimension 2 414*a*) in the current year (the unchanged dimension 1 412*a*) for the region of Africa overlayed with data for the region of Europe (the changed dimension 3 set C overlayed by set C+1 416*b*). This example may include the tuple defining the data presentation 402 of {2019, sales, Africa} may be overlayed with the data (e.g. cross product) from the tuple changed to {2019, sales, Europe} (the data presentation may be re-rendered in response to the dimension change). As another example, the downward swipe-double gesture 405*a* changes the data presentation 409, showing data for dimension 3 value 3, to overlay the next data set based on dimension 3, dimension 3 value 4, in data presentation 406. Thus, the downward swipe-double gesture 405*a* may transform 405*b* the data presentation 409 to the data presentation 406 based on a change to the data set shown in dimension 3 416*b*.

A swipe-double upward gesture 407*a* may initiate transformation 407*b* that changes data presentation 409 to data presentation 408. The upward swipe-double gesture 407*a* may have associated parameters that indicate which dimension to alter, and in what manner to alter it. The transformation 407*b* may change the data set used along dimension 3 to set C overlayed with set C−1 316*c*, thus displaying a comparison of two data sets together. The new data set overlayed in data presentation 408 may be in part defined by dimension 3 data set C−1 416*c*, which may be a new value(s) for dimension 3 compared to the value(s) for dimension 3 in data set C 416*a* (e.g. in a tuple defining the data presentation 402). The change to dimension 3 may be defined by parameters associated with the upward swipe-double gesture. For example, the data presentation 408 may show sales data (the unchanged dimension 2 414*a*) in the current year (the unchanged dimension 1 412*a*) for the region of Africa overlayed with data for the region of Asia (the changed dimension 3 set C overlayed by set C−1 416*c*). This example may include the tuple defining the data presentation 402 of {2019, sales, Africa} may be overlayed with the data (e.g. cross product) from the tuple changed to {2019, sales, Asia} (the data presentation may be re-rendered in response to the dimension change). As another example, the upward swipe-double gesture 407*a* changes the data presentation 409, showing data for dimension 3 value 3, to overlay the previous data set based on dimension 3, dimension 3 value 2, in data presentation 408. Thus, the upward swipe-single gesture 407*a* may transform 407*b* the data presentation 409 to the data presentation 408 based on a change to the data set shown in dimension 3 416*c*.

Generally, the downward swipe-double gesture 405*a* may overlay dimension 3 416*a* with the next dimension 3 data set up (incremented), to dimension 3 416*b*. Generally, the upward swipe-double gesture 407*a* may overlay dimension 3 416*a* with the next dimension 3 data set down (decremented), to dimension 3 416*c*. Actual data presented 406, 408, 409 may change accordingly, in response to the additional data from the addition of the change in dimension 3 416*a-c*. Similarly, dimension 2 414*a* may be associated with the downward or upward swipe-double gestures 405*a*, 407*a*, such as in place of dimension 3. Other dimensions may be associated with the swipe-double gestures 401*a*, 403*a*, 405*a*, 407*a* as well, which may be user configurable.

Overlaying data sets as described herein may include aligning the data sets based on similar data types or columns Overlaying may further include calculating or identifying differences (or similarities) and presenting such calculated values, such as may be accomplished by accessing the comparison calculator 114 shown in FIG. 1 with the data sets to be overlayed. Overlaying may further include highlighting or otherwise altering the presentation of the overlayed data sets to indicate the overlay and any identified differences or similarities.

A swipe-double gesture may be a motion performed with at least two extended fingers or electronic input device(s) (e.g. wand, stylus, controller, etc.), generally moving either horizontally or vertically from a single point to another, that is detectable by a gesture input receiver, such as shown in FIG. 1, similar to the swipe-single motion. If performed with an electronic device, such a device may have a button or other mechanism for indicating a swipe-double. The swipe-double gestures generally allow a user to traverse through and compare large or multiple data sets quickly and easily, using an intuitive action.

Figure 4B:
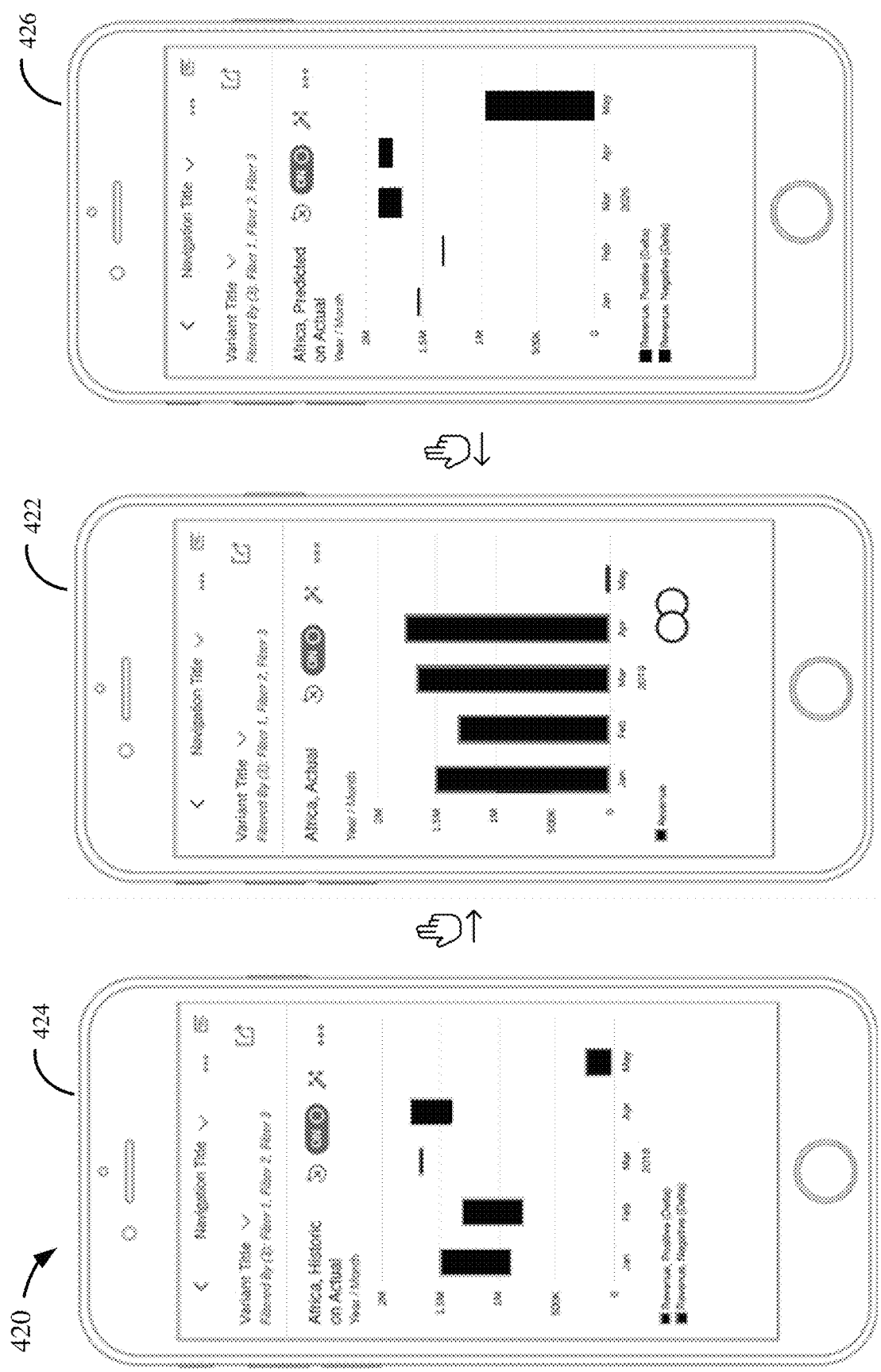
FIGS. 4B-C are examples illustrating data presentation transformations based on swipe-double gestures.

FIG. 4B is an example illustrating data presentation transformations 420 based on swipe-double gestures. A home or starting data presentation 422 may display revenue data for a year (2019) in a region (Africa). The home data presentation 422 may be transformed to data presentation 424 with a rightward swipe-double gesture, which may overlay the Africa revenue data displayed from the year 2019 with the Africa revenue data from the previous year 2018 (e.g. an overlay based on a change along a time or year dimension). The home data presentation 422 may be transformed to data presentation 426 with a leftward swipe-double gesture, which may overlay the Africa revenue data displayed from the year 2019 with the Africa revenue data from the next year 2020 (e.g. an overlay based on a change along a time or year dimension), which may be predicted or forecasted data.

Figure 4C:

FIG. 4C is an example illustrating data presentation transformations 430 based on swipe-double gestures. A home or starting data presentation 432 may display revenue data for a year (2019) in a region (Africa), similar to the home data presentation 422 shown in FIG. 3B. The home data presentation 432 may be transformed to data presentation 434 with an upward swipe-double gesture, which may overlay the 2019 revenue data displayed from the Africa region with the 2019 revenue data from the previous region, Asia (e.g. an overlay based on a change along a region dimension). The home data presentation 432 may be transformed to data presentation 436 with a downward swipe-double gesture, which may overlay the 2019 revenue data displayed from the Africa region with the 2019 revenue data from the next region, Europe (e.g. an overlay based on a change along a region dimension).

Example 6—Data Set Edges with Swipe Gesture UI Controls

The swipe-single and swipe-double gesture UI controls (both up/down and right/left) may result in a transformation to iterate through the end of a dimension, where no further values of the dimension are available and so there are no corresponding data sets to display (e.g. a data set edge). For example, swiping through a year dimension may result in making a request for data for a year for which there is no data, or for years beyond, such as requesting next year's data. As another example, swiping through a region dimension may result in making a request for the next region's data when there is not another region, such as reaching the end of the list of regions. There are several embodiments of the swiping gesture UI controls which may handle such cases.

In some embodiments, a swipe requesting more data along a dimension for which there is no more data may circle back to the first set or value or range of values for that dimension. For example, if swiping through a region dimension where the regions are "America," "Europe," "Africa," and "Asia," and a swipe is received to select the next region after "Asia," the swipe gesture UI control may select "America" as the next region.

In some embodiments, a swiping requesting more data along a dimension for which there is no more data may display a message or animation indicating that there is no more data, or that the user has reached the end of available data. In such cases, the current data set may still be displayed, such as in conjunction with the message or animation.

In some embodiments, a swiping requesting more data along a dimension for which there is no more data may request predicted data, such as from the predictive system 112 shown in FIG. 1. For example, if swiping through a year dimension where there is data for the previous two years and the current year, and the swipe requests data for the year after the current year, a predictive system may be accessed to obtain predicted or forecasted data for the next year.

In some embodiments, the implementation for handling a data set edge may include some or all of these options. For example, a predictive system may be accessed for predicted data, but if no predicted data is available, a message or animation may be displayed that the data is not available. In some embodiments, the handling of the data edges may be user-configurable, or may depend on the data type along the dimension (e.g. lists may circle back, while value ranges may retrieve predicted data).

Example 7—Single Tap UI Control

Figure 5A:
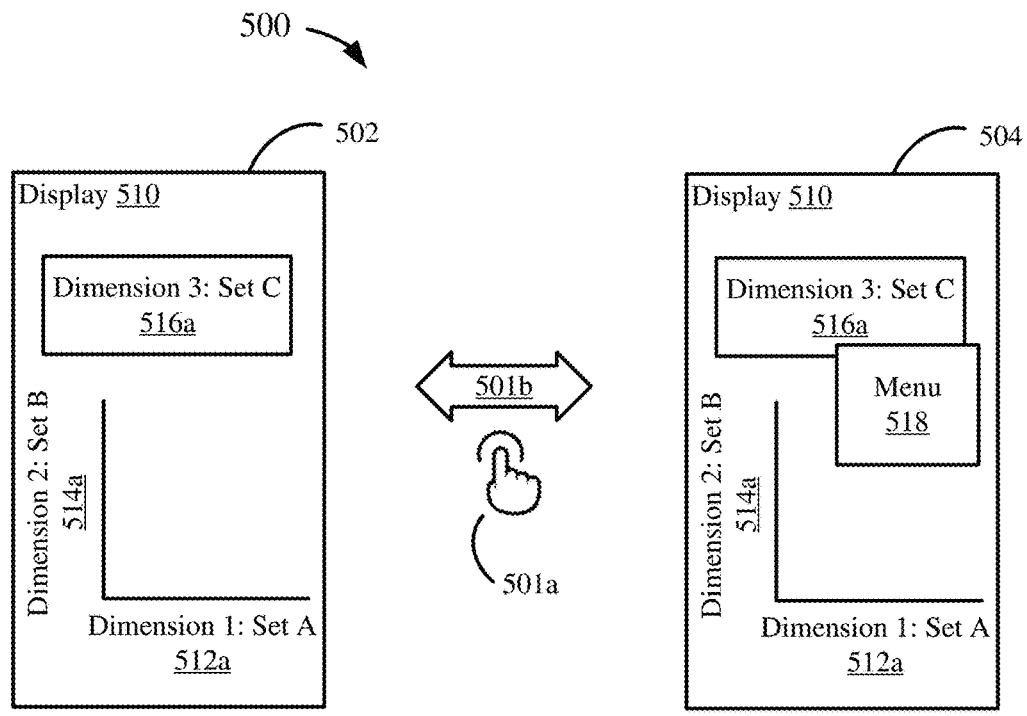
FIG. 5A illustrates data presentation transformations based on single tap gestures.

FIG. 5A illustrates data presentation transformations 500 based on single tap gestures. A first data presentation 502 may be provided in a display 510. The data presentation 502 may visualize a data set defined by three dimensions (e.g. axes or search filters) 512*a*, 514*a*, 516*a*. The different dimensions 512*a*, 514*a*, 516*a* may show only a set of the possible values for that dimension. For example, the data presentation 502 may only visualize data for values in set A for dimension 1 512*a*. Similarly, the data presentation 502 may only visualize data for values in set B for dimension 2 514*a*, and for values in set C for dimension 3 516*a*. More or fewer dimensions may be used in the data presentation 502. The data presentation 502 may provide the data in a graph form, as similarly shown, or other data visualization, such as a table or chart.

A single tap gesture 501*a* may initiate transformation 501*b* that changes data presentation 502 to data presentation 504. The single tap gesture 501*a* may have associated parameters that indicate how the transformation 501*b* should be performed. The transformation 501*b* may cause a menu 518 to be displayed and available to a user. The menu 518 may provide user options such as configuration options for the gesture UI controls as described herein (e.g. setting parameters for the gesture UI controls) or other display or navigation options, including primary actions such as "Export As" or "Save As." The menu 518 may appear at a location in the display 510 based on a relative location of the single tap gesture 501*a* in relation to the display. Alternatively or additionally, the menu 518 may appear at a predefined location in the display 510, which may be in part based on the relative location of the single tap gesture 501*a*. Generally, the menu 518 appears over other items or widgets in the display 510.

In some embodiments, transformation 501*b* may also alter the input context, which may, for example, change the functionality of other gesture-based UI controls, such as by limiting actionable inputs to selections from the menu 518 or closing the menu. For example, once a menu 518 is open as in data presentation 504, swipe gestures may be deactivated while the menu is open (the swipe gestures may be reactivated once the menu is closed).

When a menu 518 is open, a single tap gesture 501*a* may initiate transformation 501*b* that changes data presentation 504 back to data presentation 502, closing the menu. Generally, such a single tap gesture 501*a* is not on the menu 518 (e.g. not activating a menu option in the menu).

A single tap gesture may be a motion performed with a single extended finger or electronic input device (e.g. wand, stylus, controller, etc.), generally in a tapping or touching motion to a singular point or surface, that is detectable by a gesture input receiver, such as shown in FIG. 1. If performed with an electronic device, such a device may have a button or other mechanism for indicating a tap or single tap. The single tap gesture generally allows a user to access menu items or options quickly and easily, using an intuitive action.

Figure 5B:
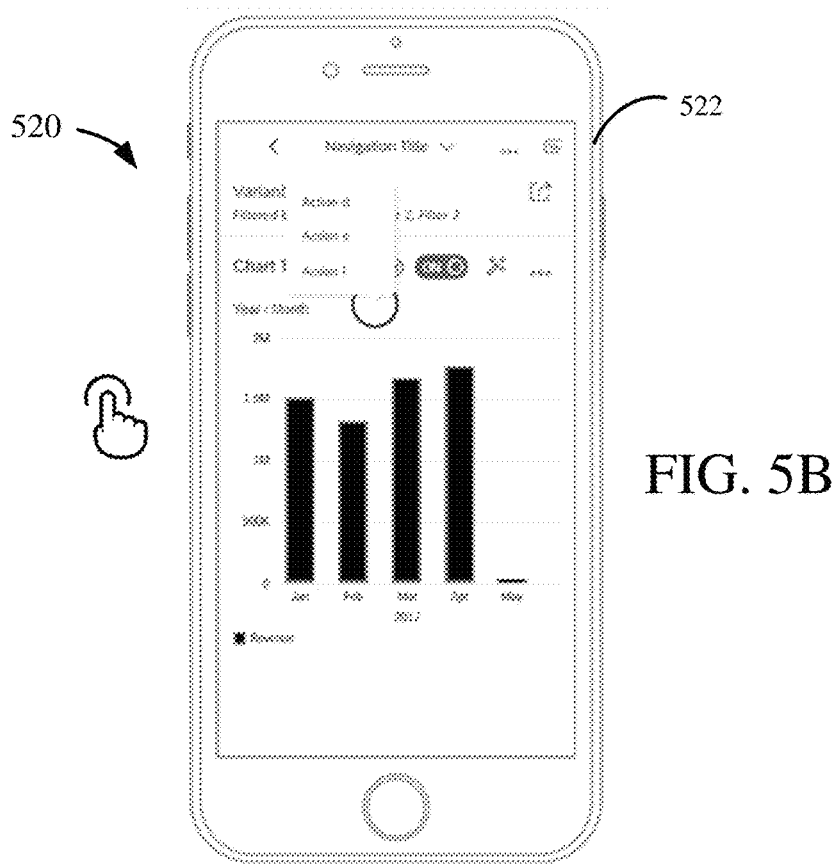
FIG. 5B is an example illustrating a data presentation transformation based on a single tap gesture.

FIG. 5B is an example illustrating a data presentation transformation 520 based on a single tap gesture. A data presentation 522 may display a data visualization with a menu open over the data displayed in response to a single tap gesture.

Example 8—Double Tap UI Control

Figure 6A:
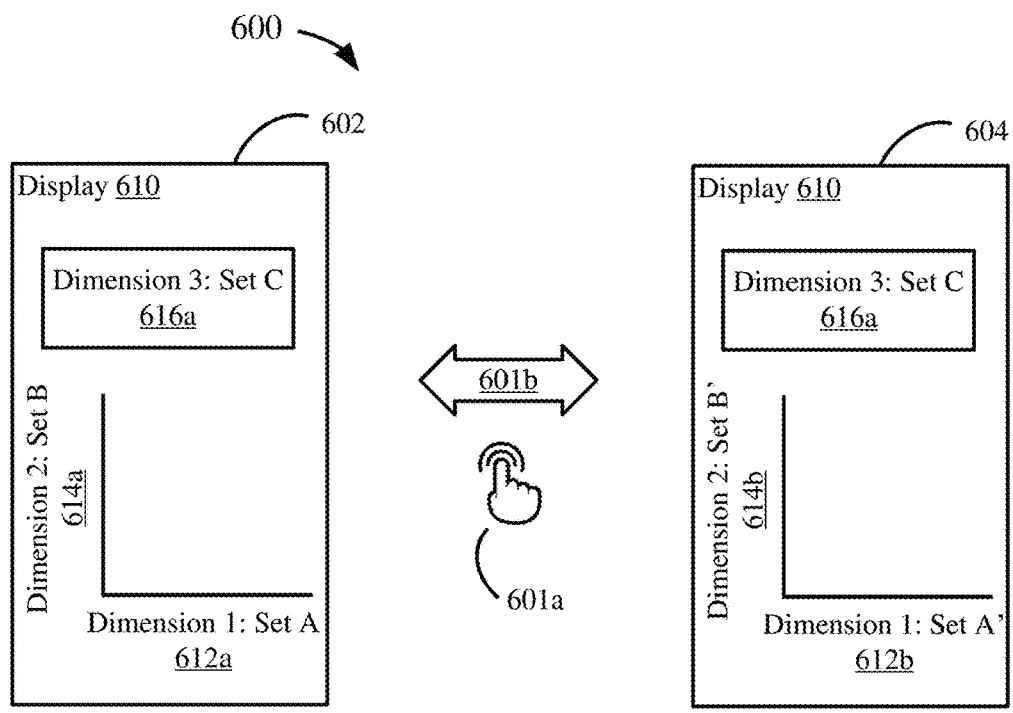
FIG. 6A illustrates data presentation transformations based on double tap gestures.

FIG. 6A illustrates data presentation transformations 600 based on double tap gestures. A first data presentation 602 may be provided in a display 610. The data presentation 602 may visualize a data set defined by three dimensions (e.g. axes or search filters) 612*a*, 614*a*, 616*a*. The different dimensions 612*a*, 614*a*, 616*a* may show only a set of the possible values for that dimension. For example, the data presentation 602 may only visualize data for values in set A for dimension 1 612*a*. Similarly, the data presentation 602 may only visualize data for values in set B for dimension 2 614*a*, and for values in set C for dimension 3 616*a*. More or fewer dimensions may be used in the data presentation 602. The data presentation 602 may provide the data in a graph form, as similarly shown, or other data visualization, such as a table or chart.

A double tap gesture 601*a* may initiate transformation 601*b* that changes data presentation 602 to data presentation 604. The double tap gesture 601*a* may have associated parameters that indicate how the transformation 601*b* should be performed. The transformation 601*b* may perform a zoom action on the visualized data. The zoom action may transform 601*b* the displayed dimension 1 data set A 612*a* to data set A' 612*b*, and transform the displayed dimension 2 data set B 614*a* to data set B' 614*b*. The zoom action may be a zoom in or a zoom out action. For a zoom in function, data set A' 612*b* may be a subset of data set A 612*a* and data set B' 614*b* may be a subset of data set B 614*a*. For a zoom out function, data set A' 612*b* may be a superset of data set A 612*a* and data set B' 614*b* may be a superset of data set B 614*a*. Generally, the zoom transformation 601*b* may zoom the displayed data to a preset or predefined level, such as based on parameters associated with the double tap gesture 601a. In some embodiments, the zoom action may be an optical or visual zoom action. In some embodiments, the zoom action may be a "fit to screen" zoom action, which may fit the data presentation 604 to the screen displaying it (e.g. display 610).

When a zoomed presentation 604 is displayed, a double tap gesture 601a may initiate transformation 601b that changes data presentation 604 back to data presentation 602, returning the data visualization to its original presentation (e.g. zoom level). In some embodiments, repeated double tape gestures 601a may cycle through a series of increasing predefined zoom in levels before cycling back to the original zoom level in presentation 502.

A double tap gesture may be a motion performed with a single extended finger or electronic input device (e.g. wand, stylus, controller, etc.), generally in a tapping or touching motion to a singular point or surface that is repeated twice in quick succession, and that is detectable by a gesture input receiver, such as shown in FIG. 1. If performed with an electronic device, such a device may have a button or other mechanism for indicating a tap or double tap. The double tap gesture generally allows a user to zoom in on data sets quickly and easily, using an intuitive action.

Figure 6B:
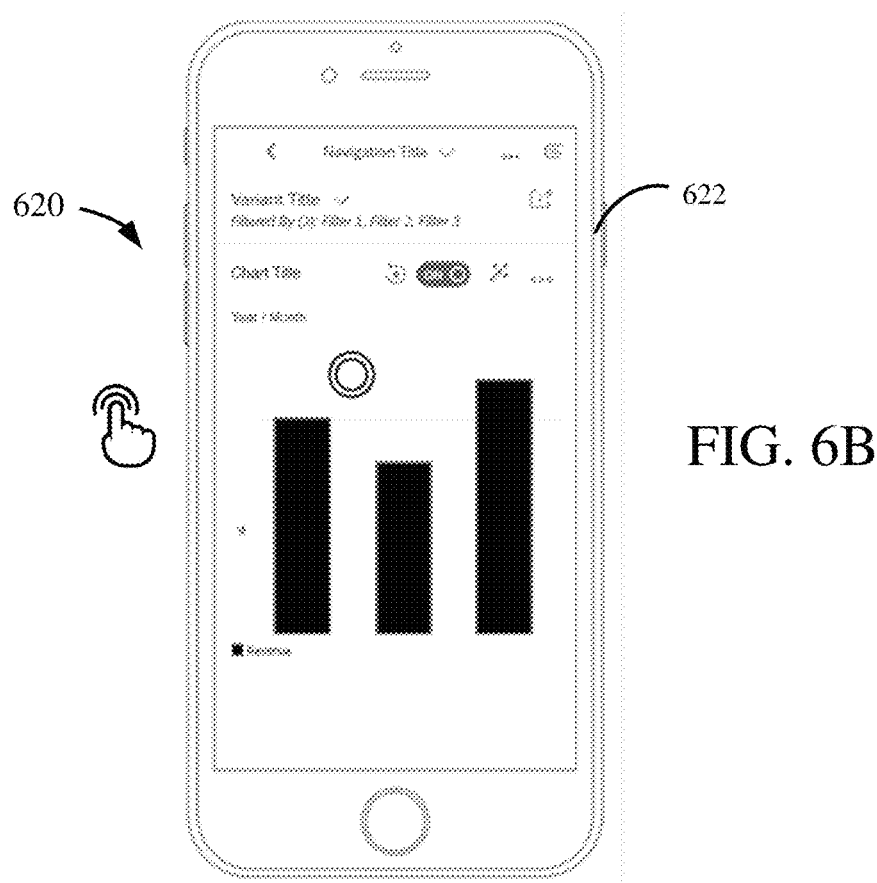
FIG. 6B is an example illustrating a data presentation transformation based on a double tap gesture.

FIG. 6B is an example illustrating a data presentation transformation 620 based on a double tap gesture. A data presentation 622 may display a data visualization with data displayed zoomed in (e.g. visually enlarged) in response to a double tap gesture.

Example 9—Hold UI Control

Figure 7A:
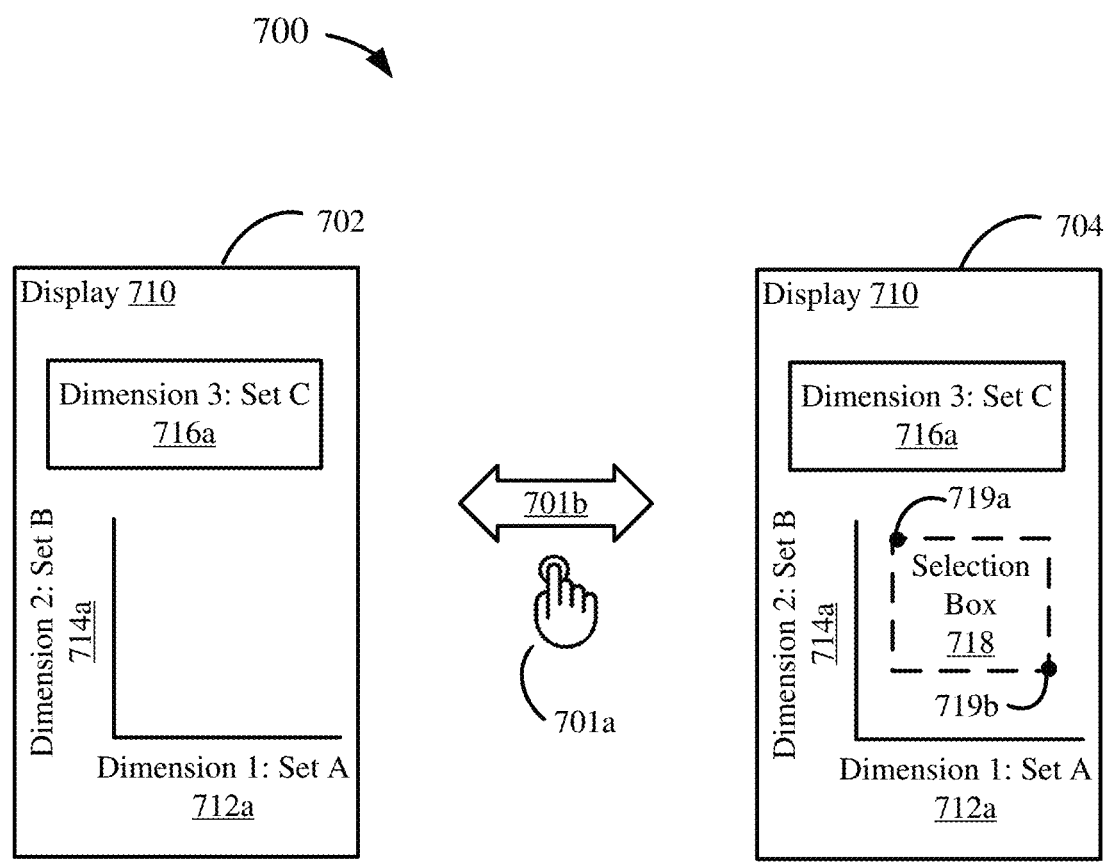
FIG. 7A illustrates data presentation transformations based on hold gestures.

FIG. 7A illustrates data presentation transformations based on hold gestures. A first data presentation 702 may be provided in a display 710. The data presentation 702 may visualize a data set defined by three dimensions (e.g. axes or search filters) 712a, 714a, 716a. The different dimensions 712a, 714a, 716a may show only a set of the possible values for that dimension. For example, the data presentation 702 may only visualize data for values in set A for dimension 1 712a. Similarly, the data presentation 702 may only visualize data for values in set B for dimension 2 714a, and for values in set C for dimension 3 716a. More or fewer dimensions may be used in the data presentation 702. The data presentation 702 may provide the data in a graph form, as similarly shown, or other data visualization, such as a table or chart.

A hold gesture 701a may initiate transformation 701b that changes data presentation 702 to data presentation 704. The hold gesture 701a may have associated parameters that indicate how the transformation 701b should be performed. The transformation 701b may cause a selection box 718 to be displayed and available to a user for highlighting a portion of the visualized data. The selection box 718 may highlight the visualized data within the selection box, such as by altering the presentation color, bolding, italicizing, or other otherwise altering the presentation or format within the selection box. The manner of highlighting may be set by parameters associated with the hold gesture 701a, which may be user configurable.

The selection box 718 may appear at a location in the display 710 based on a relative location of the hold gesture 701a in relation to the display. Alternatively or additionally, the selection box 718 may appear at a predefined location in the display 710, which may be in part based on the relative location of the hold gesture 701a. Generally, the selection box 718 appears over other items or widgets in the display 710.

The selection box 718 may have one or more anchor points 719a-b. The anchor points 719a-b may be used to adjust the size or the shape of the selection box 718 (or both), generally by selecting and moving an anchor point. The anchor points 719a-b may be selected by a hold gesture 701a over the anchor point 719a-b, and then moved once selected to adjust the size of the selection box 718.

When a highlighted presentation 704 is displayed, a hold gesture 701a may initiate transformation 701b that changes data presentation 704 back to data presentation 702, removing the selection box 718 (e.g. highlighting). In some embodiments, other gestures may be used to return to the standard data presentation 702, such as a single tap or a double tap gesture.

In some embodiments, transformation 701b may also alter the input context, which may, for example, change the functionality of other gesture-based UI controls, such as by limiting actionable inputs to selections from a menu or manipulating the selection box 718 or anchor points 719a-b. For example, once a selection box 718 is active as in data presentation 704, swipe gestures may be deactivated while the selection box is open (the swipe gestures may be reactivated once the selection box is closed). Further, a menu (not shown) may be made available to perform primary actions (e.g. export data, export presentation as an image, save data) or other actions (e.g. save to a collection as described herein) on the data highlighted by the selection box 718.

A hold gesture may be a motion performed with a single extended finger or electronic input device (e.g. wand, stylus, controller, etc.), generally in a touching motion to a singular point or surface that is then held for a moment in place of being immediately retracted, and that is detectable by a gesture input receiver, such as shown in FIG. 1. If performed with an electronic device, such a device may have a button or other mechanism for indicating a hold. The hold gesture generally allows a user to highlight data sets quickly and easily, using an intuitive action.

Figure 7B:
FIG. 7B is an example illustrating a data presentation transformation based on a hold gesture.

FIG. 7B is an example illustrating a data presentation transformation 720 based on a hold gesture. A data presentation 722 may display a data visualization, and may be transformed into data presentation 724a in response to a double tap gesture, with a selection box over the data visualization. Manipulating the selection box, such as by touching and moving the anchor points, may result in data presentation 724b.

Example 10—Pinch and Spread UI Controls

Figure 8A:
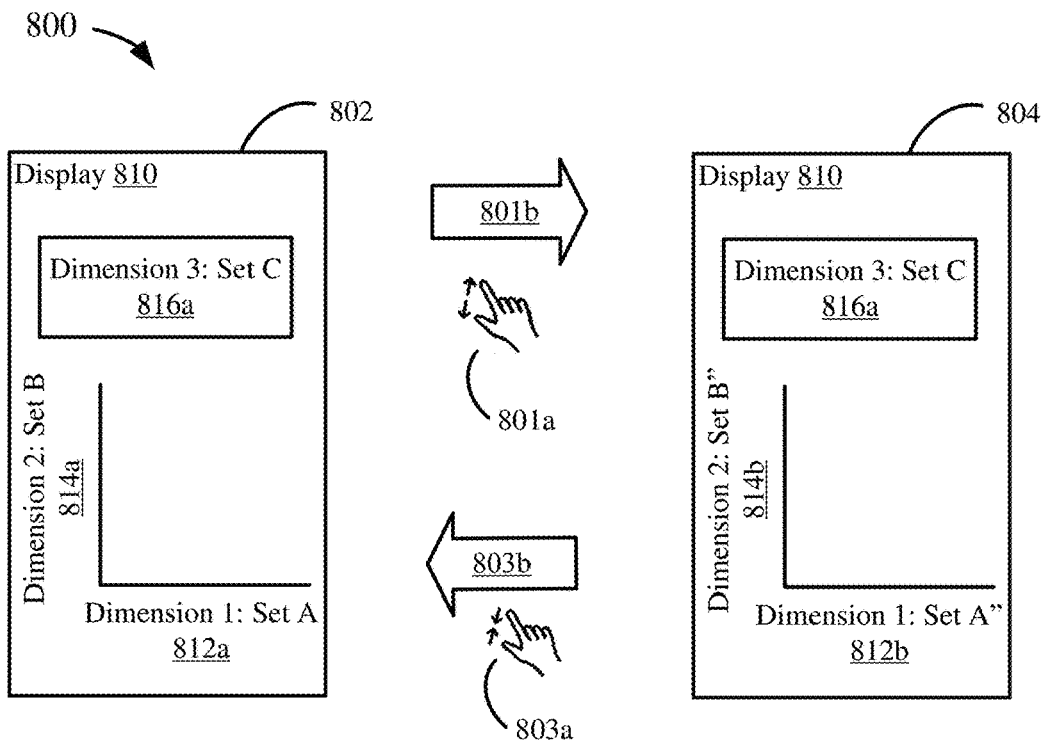
FIG. 8A illustrates data presentation transformations based on spread-pinch gestures.

FIG. 8A illustrates data presentation transformations 800 based on spread-pinch gestures. A first data presentation 802 may be provided in a display 810. The data presentation 802 may visualize a data set defined by three dimensions (e.g. axes or search filters) 812a, 814a, 816a. The different dimensions 812a, 814a, 816a may show only a set of the possible values for that dimension. For example, the data presentation 802 may only visualize data for values in set A for dimension 1 812a. Similarly, the data presentation 802 may only visualize data for values in set B for dimension 2 814a, and for values in set C for dimension 3 816a. More or fewer dimensions may be used in the data presentation 802. The data presentation 802 may provide the data in a graph form, as similarly shown, or other data visualization, such as a table or chart.

A spread gesture 801*a* may initiate transformation 801*b* that changes data presentation 802 to data presentation 804. The spread gesture 801*a* may have associated parameters that indicate how the transformation 801*b* should be performed. The transformation 801*b* may perform a zoom in action on the visualized data. The zoom in action may transform 801*b* the displayed dimension 1 data set A 812*a* to data set A" 812*b*, and transform the displayed dimension 2 data set B 814*a* to data set B" 814*b*. Generally for the zoom in transformation 801*b*, data set A" 812*b* may be a subset of data set A 812*a* and data set B" 814*b* may be a subset of data set B 814*a*. The spread gesture 801*a* may be repeated at data presentation 804 to further zoom in the data presentation by the transformation 801*b*. Generally, the zoom in transformation 801*b* may zoom the displayed data to a level based on the degree of the spread gesture 801*a* or one or more of the associated parameters (or both).

In some embodiments, the zoom action from transformation 801*a* may be a drill-down zoom. A dimension 812*a*, 814*a*, 816*a* may have one or more sub-dimensions. For a drill-down zoom, a dimension with one or more sub-dimensions may be divided and displayed based on those sub-dimensions. For example, the data presentation 802 may display sales data (dimension 2 814*a*) for a given year shown quarterly (dimension 1 812*a*). A drill-down zoom transformation 801*a* may split the quarterly sales data along dimension 1 812*a* into monthly data along dimension 1 812*b*, or may split a given quarter (such as Q3) into its respective months along dimension 1 812*b* (e.g. July, August, September).

A pinch gesture 803*a* may initiate transformation 803*b* that changes data presentation 804 to data presentation 802. The pinch gesture 803*a* may have associated parameters that indicate how the transformation 803*b* should be performed. The transformation 803*b* may perform a zoom out action on the visualized data. The zoom out action may transform 803*b* the displayed dimension 1 data set A" 812*b* to data set A 812*a*, and transform the displayed dimension 2 data set B" 814*b* to data set B 814*a*. Generally for the zoom out transformation 803*b*, data set A 812*a* may be a superset of data set A" 812*b* and data set B 814*a* may be a superset of data set B" 814*b*. Generally, the zoom out transformation 803*b* may zoom the displayed data to a level based on the degree of the pinch gesture 803*a* or one or more of the associated parameters (or both).

Generally, the spread-pinch gesture 801*a*, 803*a* initiates manual zoom transformations 801*b*, 803*b*. The zoom functionality of the spread-pinch gesture 801*a* 803*a* is different from the single tap zoom functionality, as described herein, as it is a manual zoom allowing for on-the-fly custom zoom levels, unlike the predefined zoom level functionality of the single tap gesture. The zoom in or zoom out transformations 801*b*, 803*b* may be repeated to set the zoom level of the data presentation 802, 804. Generally, returning to the initial zoom level at data presentation 802 ends the manual zoom functionality. In some embodiments, or gesture UI controls may be provided to return the zoom level to the original zoom level, or to lock in the current zoom level, such as a single tap or double tap. The spread-pinch gestures generally allow a user to zoom in or out on data sets quickly and easily, using an intuitive action.

In some embodiments, transformation 801*b* may also alter the input context, which may, for example, change the functionality of other gesture-based UI controls, such as by limiting actionable inputs to zoom actions or closing the zoom. For example, once a data presentation 804 is zoomed, swipe gestures may be deactivated while the zoom is active (the swipe gestures may be reactivated once the data presentation is returned to normal).

Figure 8B:
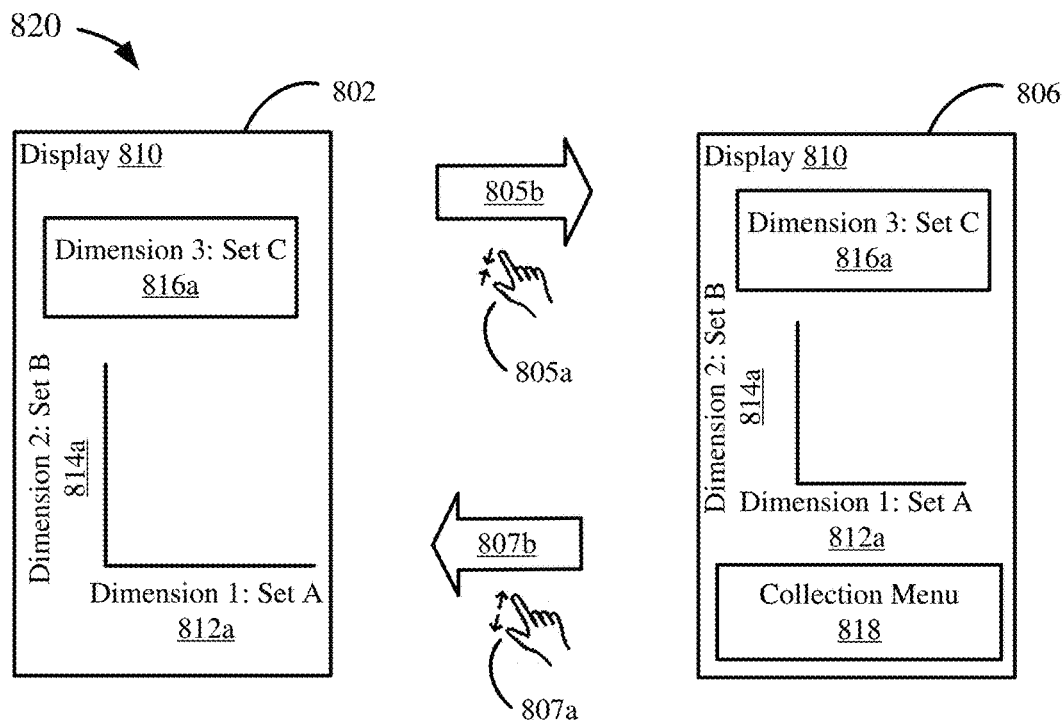
FIG. 8B illustrates data presentation transformations based on pinch-spread gestures.

FIG. 8B illustrates data presentation transformations 820 based on pinch-spread gestures. A first data presentation 802 may be provided as similarly described for FIG. 8A.

A pinch gesture 805*a* may initiate transformation 805*b* that changes data presentation 802 to data presentation 806. The pinch gesture 805*a* may have associated parameters that indicate how the transformation 805*b* should be performed. The transformation 805*b* may cause a collection menu 818 to be displayed. In some embodiments, the collection menu 818 may appear over the data visualization. In other embodiments, the data visualization (e.g. dimension 1 812*a*, etc.) may shrink to remain unobscured. The collection menu 818 may provide access to one or more previously saved data sets, which may be selected to be displayed in place of the current data set, or overlayed with the current data set, or displayed as an initial data set, etc. Further, the collection menu 818 may provide options for saving the currently displayed data set. In this way, the collection menu may provide quick access to other data sets previously saved (e.g. retrieved), which may avoid executing (or constructing and executing) a new data query.

A spread gesture 807*a* may initiate transformation 807*b* that changes data presentation 806 to data presentation 802. The spread gesture 807*a* may have associated parameters that indicate how the transformation 807*b* should be performed. The transformation 807*b* may close the collection menu 818. In some embodiments, the transformation 807*b* may also be performed after the current data set is saved or after a data set is selected from the collection menu 818. Generally, the spread gesture 807*a* returns the data presentation 806 to the previous data presentation 802. In some embodiments, other gestures as describe herein may be used to initiate the transformation 807*b* and return the data presentation 806 to data presentation 802. For example, a single tap gesture may be used in place of the spread gesture 807*a* to initiate transformation 807*b*.

In some embodiments, the collection menu 818 may appear from the bottom of the display. In other embodiments, the collection menu 818 may appear from other sides or parts of the display. In other embodiments, the collection menu 818 may cover the entire display. The pinch-spread gestures generally allow a user to save or store data sets quickly and easily, using an intuitive action.

In some embodiments, transformation 805*b* may also alter the input context, which may, for example, change the functionality of other gesture-based UI controls, such as by limiting actionable inputs to selections from the collection menu 818 or closing the menu. For example, once a collection menu 818 is open as in data presentation 806, swipe gestures may be deactivated while the collection menu is open (the swipe gestures may be reactivated once the collection menu is closed).

A pinch gesture may be a motion performed with two fingers or an electronic input device or devices (e.g. wand, stylus, controller, etc.), generally with both fingers moving together from opposite or separate positions, that is detectable by a gesture input receiver, such as shown in FIG. 1. If performed with an electronic device, such a device may have a button or other mechanism for indicating a pinch or pinching.

A spread gesture may be a motion performed with two fingers or an electronic input device or devices (e.g. wand, stylus, controller, etc.), generally with both fingers moving away from each other, that is detectable by a gesture input receiver, such as shown in FIG. 1. If performed with an electronic device, such a device may have a button or other mechanism for indicating a spread or spreading.

Figure 8C:
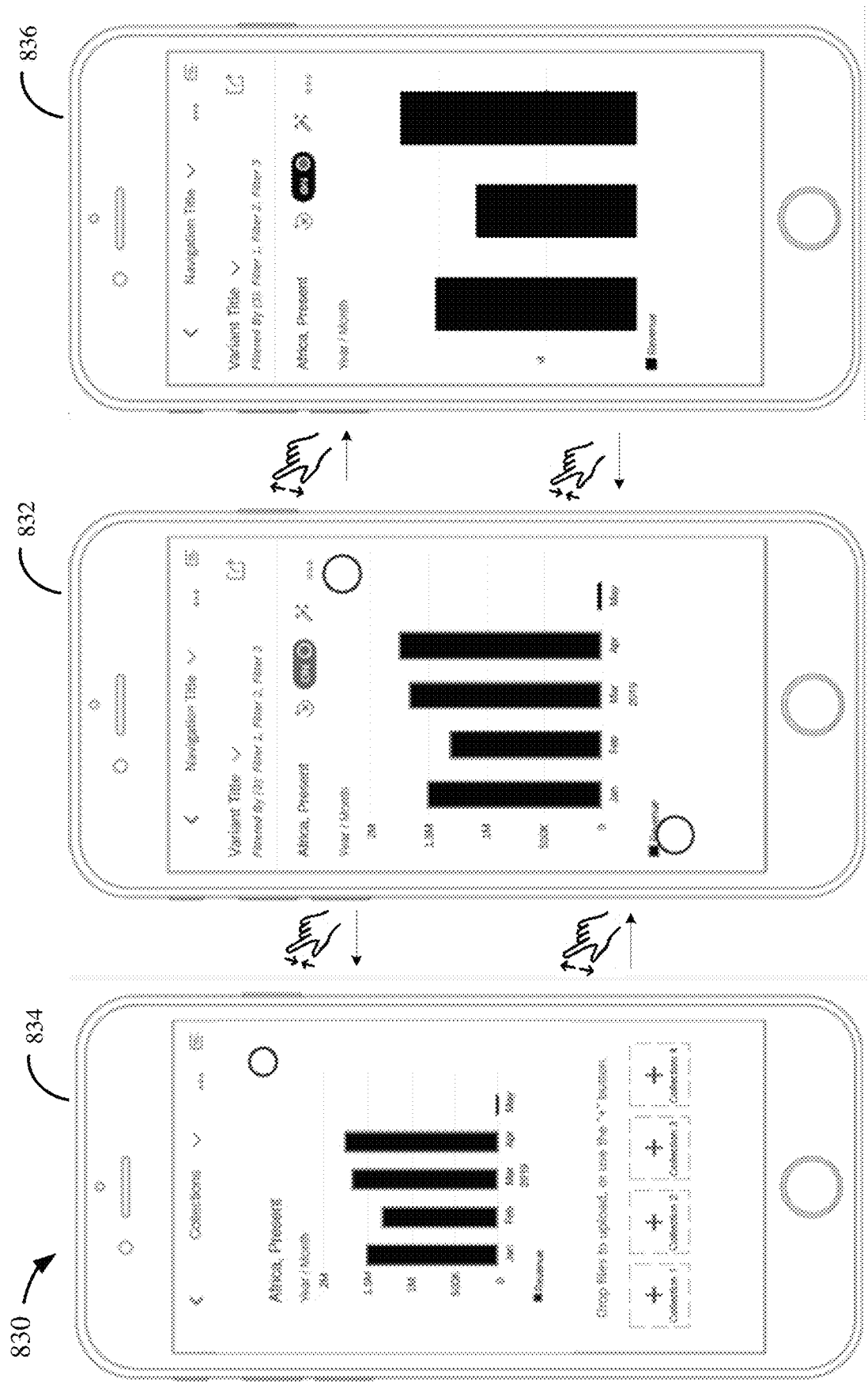
FIG. 8C is an example illustrating data presentation transformations based on spread-pinch and pinch-spread gestures.

FIG. 8C is an example illustrating data presentation transformations 830 based on spread-pinch and pinch-spread gestures. A home or starting data presentation 832 may display a data visualization. The home data presentation 832 may be transformed to data presentation 834 with a pinch gesture, which may result in a collections menu being displayed for storing the displayed data or retrieving a previously stored data set. The data presentation 834 may be returned to the home data presentation 832 with a spread gesture. The home data presentation 832 may be transformed to data presentation 836 with a spread gesture, which manually zoom in on the data visualization (e.g. based on the extent or degree of the spread gesture). Once in zoom, a spread gesture may continue to increase the zoom (zoom in) while a pinch gesture may continue to decrease the zoom (zoom out). The data presentation 836 may be returned to the home data presentation 832 with a pinch gesture, such as a pinch gesture to an extent or degree enough to sufficiently decrease the zoom (zoom out) to the original level.

Figure 8D:
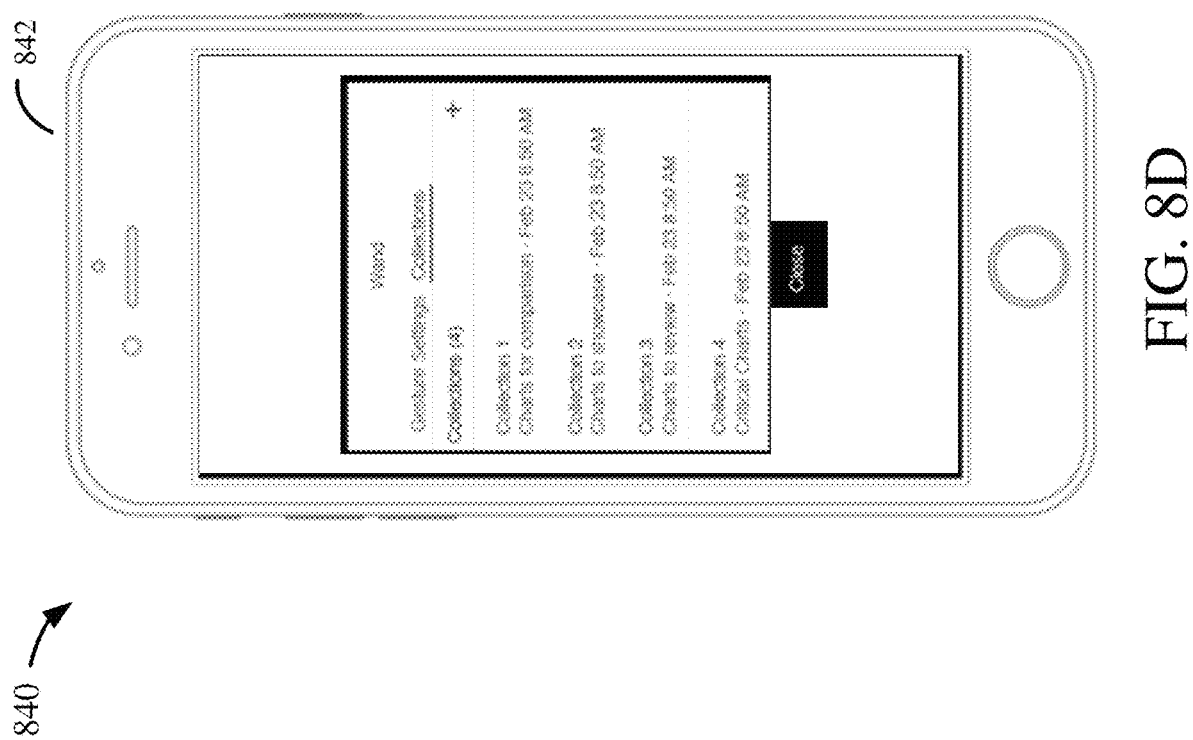
FIG. 8D is an example data display of a drill-down on a collections menu.

FIG. 8D is an example 840 data display of a drill-down on a collections menu (e.g. opened) 842, as described herein.

Example 11—Data Set Traversal and Reset

Swipe-single gestures, as described herein, generally allow a user to traverse multiple data sets, or a large data set being displayed in multiple smaller data sets. An analytics system using gesture UI controls as described herein may track a user's traversal through separate data presentations and their respective data sets. Such tracking may allow the analytics system to visualize or otherwise present the user with information about what data has already been reviewed or otherwise displayed.

Further, knowledge of the initial starting (e.g. "home") position in a large data set, or the initially presented data set, may be maintained in the analytics system. A reset or home button, such as shown in FIG. 2B, may be provided to a user for quickly returning to the initial data set presented, thus allowing a user to quickly return to their starting point in the data and proceed to traverse to other data sets.

Example 12—Data Analytics Gesture UI Control Process

Figure 9A:
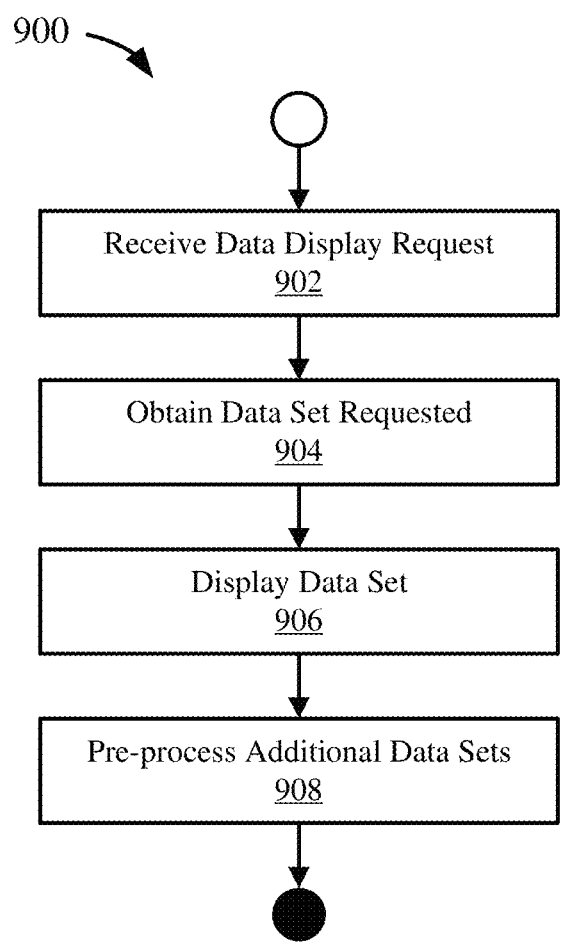
FIG. 9A illustrates a process for data pre-processing for gesture-based UI controls.

FIG. 9A is a flowchart illustrating a process 900 for data pre-processing for gesture-based UI controls. A data display request may be received at 902. The display request may be a gesture UI control as described herein, or may be another received input request, such as a request as part of initiating an analytics program. The data set for display may be obtained at 904. Obtaining the data set may include accessing a database, such as sending a request to a database management system (e.g. a query, such as an SQL query, or commands that can be converted to a suitable query), or it may include accessing a data set stored or hosted locally, such as a pre-processed data set. The data set may be displayed at 906. Data sets displayed at 906 may be initial data sets before a user has begun traversing available data or otherwise manipulating the data displayed as described herein.

Additional data sets (e.g. data sets not requested at 902) may be pre-processed at 908. Pre-processing may include obtaining the data sets from a data source, such as a remote database. Other pre-processing actions may be taken on the data sets as well, such as calculating values for display based on the data set (e.g. aggregate values), formatting the data, or pre-rendering the visualization of the data. Pre-processing the data at 908 may be based, in whole or in part, on available gesture UI controls in the system, to prepare data for display based on possible user requests through UI gestures. Such pre-preprocessing may reduce the response time to display data requested through gesture UI controls, thus allowing a user to more quickly or easily traverse data.

Figure 9B:
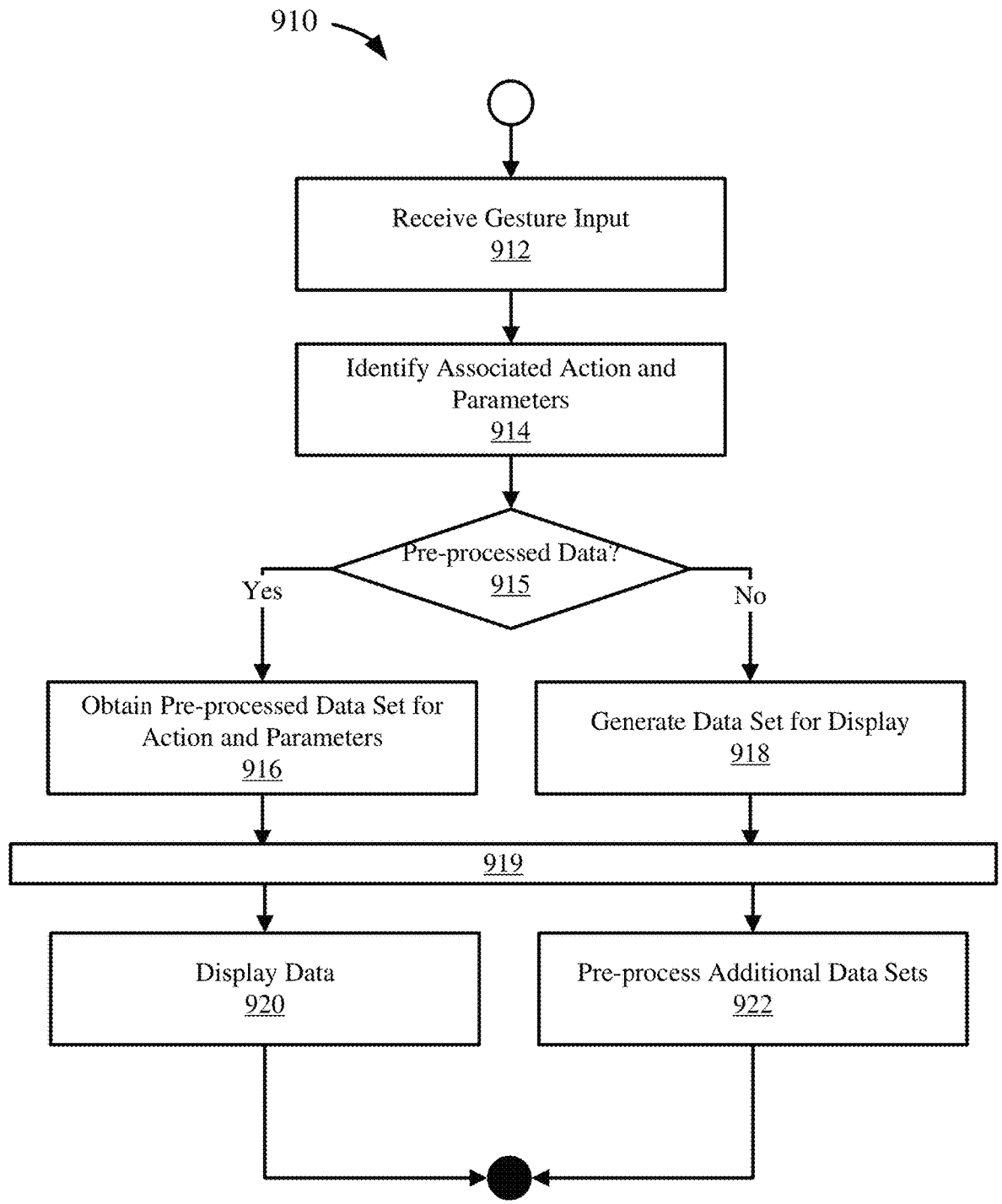
FIG. 9B illustrates a process for data analytics display using gesture-based UI controls.

FIG. 9B is a flowchart illustrating a process 910 for data analytics display using gesture-based UI controls. The process 910 may perform the gesture UI control transformations as described herein. A gesture UI control, such as described herein, may be received at 912. Receiving the gesture UI control at 912 may be or include receiving an input code signal associated with the gesture UI control from a gesture receiver or input device, as shown in FIG. 1. The gesture UI control may be associated with a particular action and one or more parameters, as described herein. The associated action and parameters may be identified at 914.

Based on the gesture UI control and the associated action and parameters, the process 910 may determine if pre-processed data is available for the gesture UI control 915. For example, a flag may be set in the associated parameters for the gesture UI control. If pre-processed data is available ("yes" at 915), then the pre-processed data set is obtained for the gesture UI control at 916. For example, an associated parameter for the gesture UI control may provide a link to or address for the pre-processed data set for the gesture UI control.

If pre-processed data is not available ("no" at 915), then a data set for display is generated at 918. The data set generated at 918 may be based on the gesture UI control and the associated action and parameters. Generating the data set at 918 may include accessing a data source, such as a database, data file, analytics system, or a predictive data system, and retrieving data based on the parameters associated with the gesture UI control. Generating the data set at 918 may include data processing similar to data pre-processing as described herein, such as calculating aggregate or display values, formatting the data, or pre-rendering the visualization of the data.

Displaying the requested data set at 920 and pre-processing additional data sets at 922 may be performed in parallel 919. Generally, the pre-processing at 922 may continue in the background while the data is displayed at 920.

The pre-processed data set (from step 916) or the generated data set (from step 918) may be displayed at 920. Displaying the data set at 920 may include performing one of the data transformations for the gesture UI control as described herein. For example, some gestures may replace a previously displayed data set with the new data set, while other gestures may overlay a new data set on the currently displayed data set.

Additional data sets may be pre-processed at 922, which may be similar to the pre-process of step 908 of process 900 shown in FIG. 9A. The additional data sets to pre-process 922 may be determined based on the data set displayed at 920 and available gesture UI controls for the process 910 and their associated actions and parameters. For example, additional data sets for swipe-single or swipe-double gestures may be pre-processed based on the dimensions associated with those gestures and the current values of the associated dimensions in the current data set. Furthering the example, if a data set is displayed at 920 for the current year, additional data sets for similar data but for the previous year and the next year may be pre-processed at 922 if the year is associated with a gesture UI control (e.g. a swipe-single or swipe-double gesture). Pre-processing such additional data sets at 922 may include accessing a data source, such as a database or data file (which may be remote or local), and storing the retrieved data locally. Pre-processing at 922 may further include setting a parameter associated with one or more gesture UI controls with the location or other address or reference information to retrieve the pre-processed data. Other pre-processing actions may be taken as well at 922, such as calculating aggregate data values, formatting data for display, or pre-rendering the visualization of the data. Pre-processing additional data sets at 922 generally improves the performance of the analytics system by displaying data faster in response to gesture UI controls.

Pre-processing at 922 may include pre-fetching data sets based on the current data set and the gesture UI control received at 912. Generally, pre-fetching includes storing the pre-processed data locally for quick retrieval for display. In some embodiments, the additional data sets pre-processed at 922 may be the next data sets for the gesture UI control received at 912, if that gesture was repeated. For example, if a swipe-single gesture was received at 912, then the additional data sets pre-processed at 922 may be data sets for if a swipe-single gesture was the next input gesture received.

In some embodiments, an available input gesture hierarchy may be used to determine which data sets to pre-process at 922. For example, for swipe gestures, data sets for swipe gesture UI controls in the same direction as the received swipe gesture from 912 may be pre-processed before data sets for swipe gestures in other directions (or other kinds of gestures). In some embodiments, the separate data sets pre-processed at 922 may be pre-processed in parallel.

Generally, once a data set is pre-processed at 922, it is not pre-processed again and remains in local memory ready for display. For example, a pre-processed data set may be stored in cache memory. In some embodiments, pre-processed data may also be stored in persistent storage for later or offline use. Pre-process at 922 may include determining if the data set to be pre-processed has already been pre-processed and is ready for use.

In some embodiments, the gesture UI control received at 912 is associated with an action that does not require additional data sets for display. For example, the gesture UI control may display a menu or highlight a selection. In such cases, the process 910 may skip to displaying the data at 920, which may not include updating the display to render the appropriate response to the gesture UI control (e.g. a menu, a selection box, etc.).

Example 13—Additional Gesture UI Control Processes

Figure 10A:
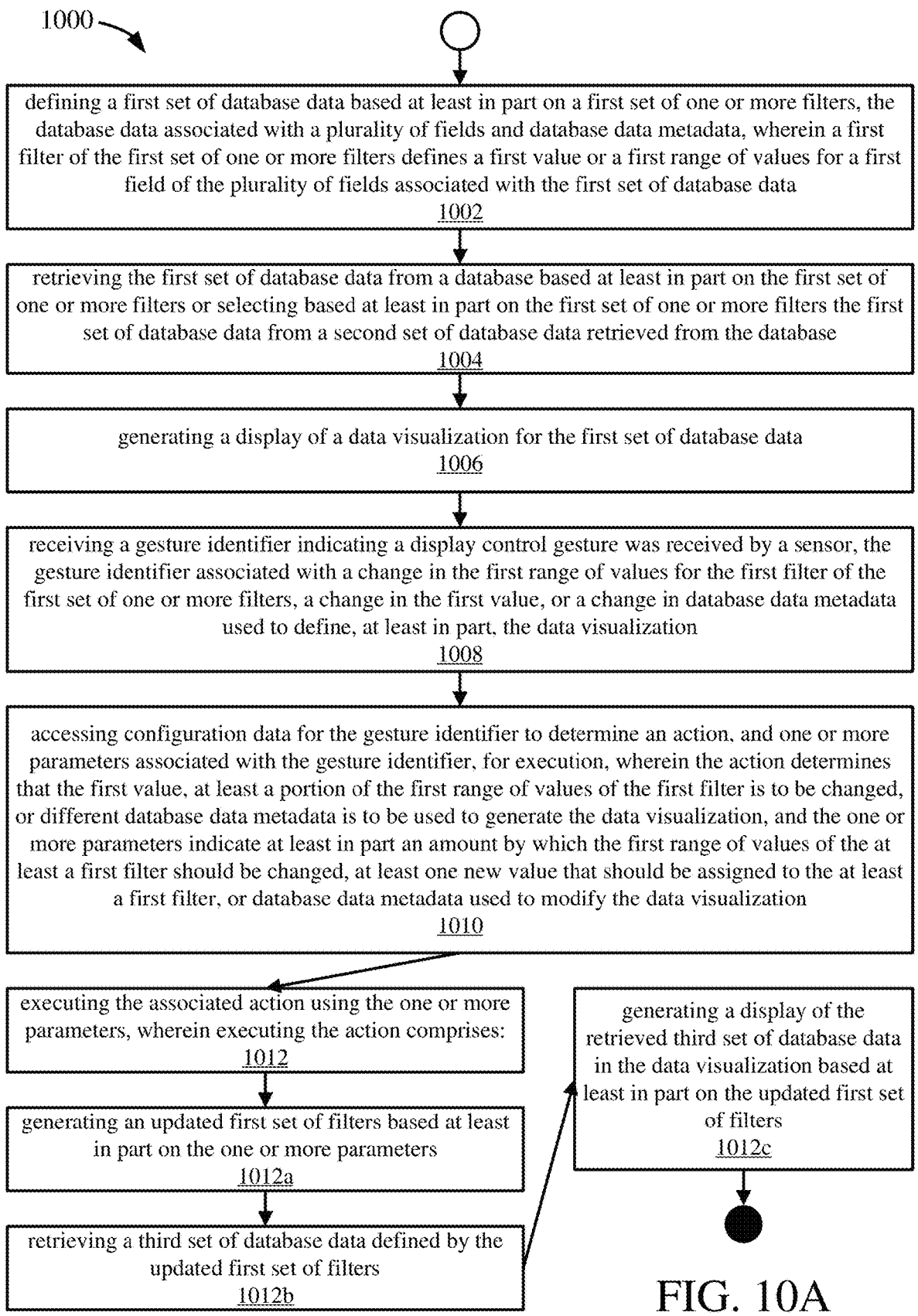
FIG. 10A is a flowchart illustrating a process for traversing data of a data display.

FIG. 10A is a flowchart illustrating a process 1000 for traversing data of a data display. A first set of database data may be defined based at least in part on a first set of one or more filters at 1002. As used herein, database data can refer to records, portions of records (e.g. a selection of fields), OLAP data, or spreadsheet data. In particular examples, database data may refer to data that can be obtained by submitting suitable statements in a query language to a DBMS or analytics system for processing. The database data may be associated with a plurality of fields and database data metadata, and a first filter of the first set of one or more filters may define a first value or a first range of values for a first field of the plurality of fields associated with the first set of database data. As used herein, database data metadata may include data descriptions, such as a datatype, or user-configuration data or parameters for manipulating the database data using the gesture UI controls described herein. The first set of database data may be retrieved at 1004 from a database based at least in part on the first set of one or more filters or may be selected at 1004 based at least in part on the first set of one or more filters the first set of database data from a second set of database data retrieved from the database. A display of a data visualization for the first set of database data may be generated at 1006.

A gesture identifier may be received at 1008 indicating a display control gesture was received by a sensor. The gesture identifier may be associated with a change in the first range of values for the first filter of the first set of one or more filters, a change in the first value, or a change in database data metadata used to define, at least in part, the data visualization. Configuration data for the gesture identifier may be accessed at 1010 to determine an action, and one or more parameters associated with the gesture identifier, for execution. The action may determine that the first value, at least a portion of the first range of values of the first filter is to be changed, or different database data metadata is to be used to generate the data visualization, and the one or more parameters indicate at least in part an amount by which the first range of values of the at least a first filter should be changed, at least one new value that should be assigned to the at least a first filter, or database data metadata used to modify the data visualization.

The associated action may be executed at 1012 using the one or more parameters. Executing the action may include generating an updated first set of filters based at least in part on the one or more parameters at 1012a. Executing the action may further include retrieving a third set of database data defined by the updated first set of filters at 1012b. Executing the action may include also generating a display of the retrieved third set of database data in the data visualization based at least in part on the updated first set of filters at 1012c.

Figure 10B:
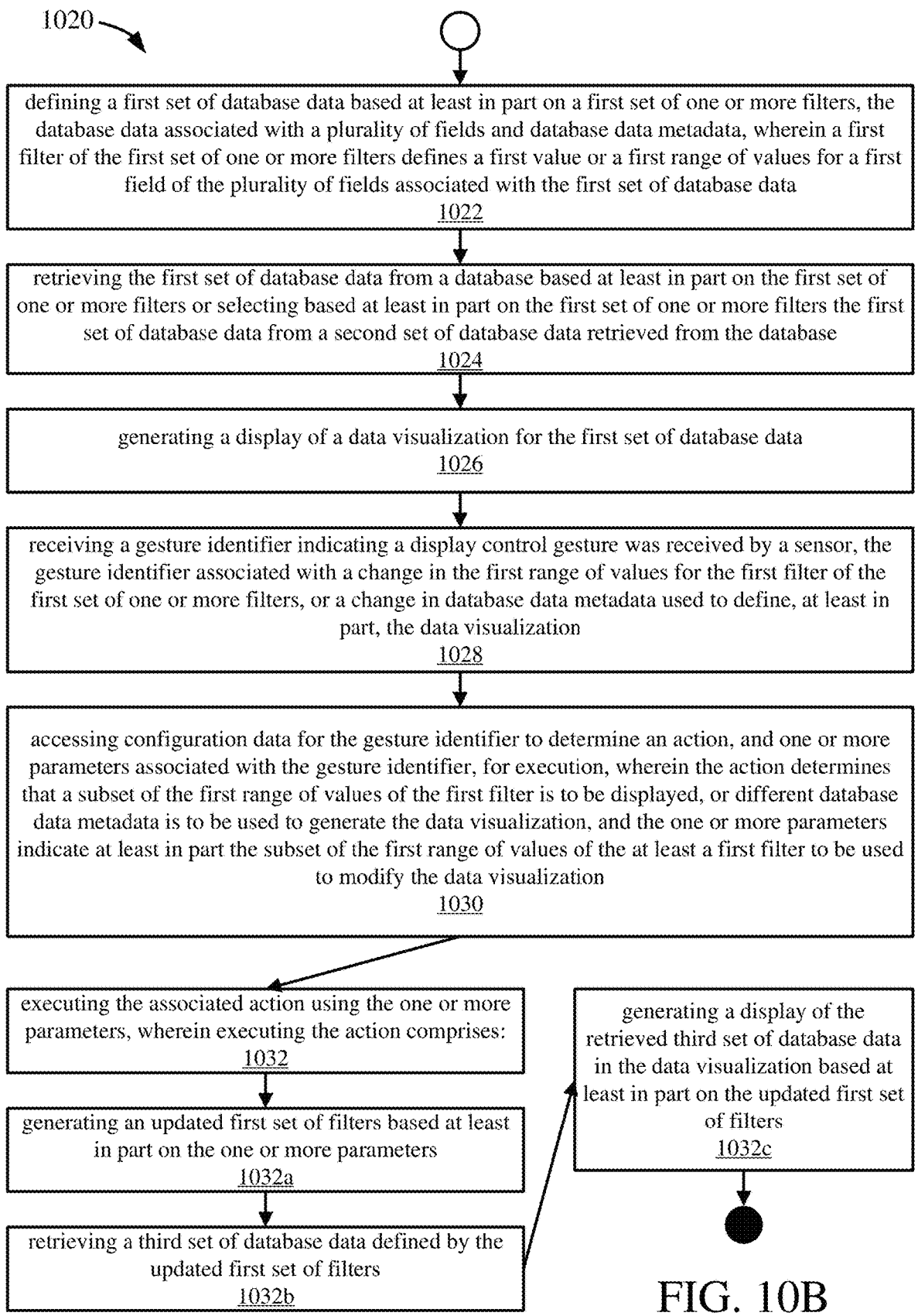
FIG. 10B is a flowchart illustrating a process for zooming of displayed data.

FIG. 10B is a flowchart illustrating a process 1020 for zooming of displayed data. A first set of database data may be defined at 1022 based at least in part on a first set of one or more filters, and the database data may be associated with a plurality of fields and database data metadata. A first filter of the first set of one or more filters may define a first value or a first range of values for a first field of the plurality of fields associated with the first set of database data. The first set of database data may be retrieved at 1024 from a database based at least in part on the first set of one or more filters or may be selected at 1024 based at least in part on the first set of one or more filters the first set of database data from a second set of database data retrieved from the database. A display of a data visualization for the first set of database data may be generated at 1026.

A gesture identifier may be received at 1028 indicating a display control gesture was received by a sensor. The gesture identifier may be associated with a change in the first range of values for the first filter of the first set of one or more filters, or a change in database data metadata used to define, at least in part, the data visualization. Configuration data for the gesture identifier may be accessed at 1030 to determine an action, and one or more parameters associated with the gesture identifier, for execution. The action may determine that a subset of the first range of values of the first filter is to be displayed, or different database data metadata is to be used to generate the data visualization, and the one or more parameters indicate at least in part the subset of the first range of values of the at least a first filter to be used to modify the data visualization.

The associated action may be executed at 1032 using the one or more parameters. Executing the action may include generating an updated first set of filters based at least in part on the one or more parameters at 1032*a*. Executing the action may further include retrieving a third set of database data defined by the updated first set of filters at 1032*b*. Executing the action may also include generating a display of the retrieved third set of database data in the data visualization based at least in part on the updated first set of filters at 1032*c*.

Figure 10C:
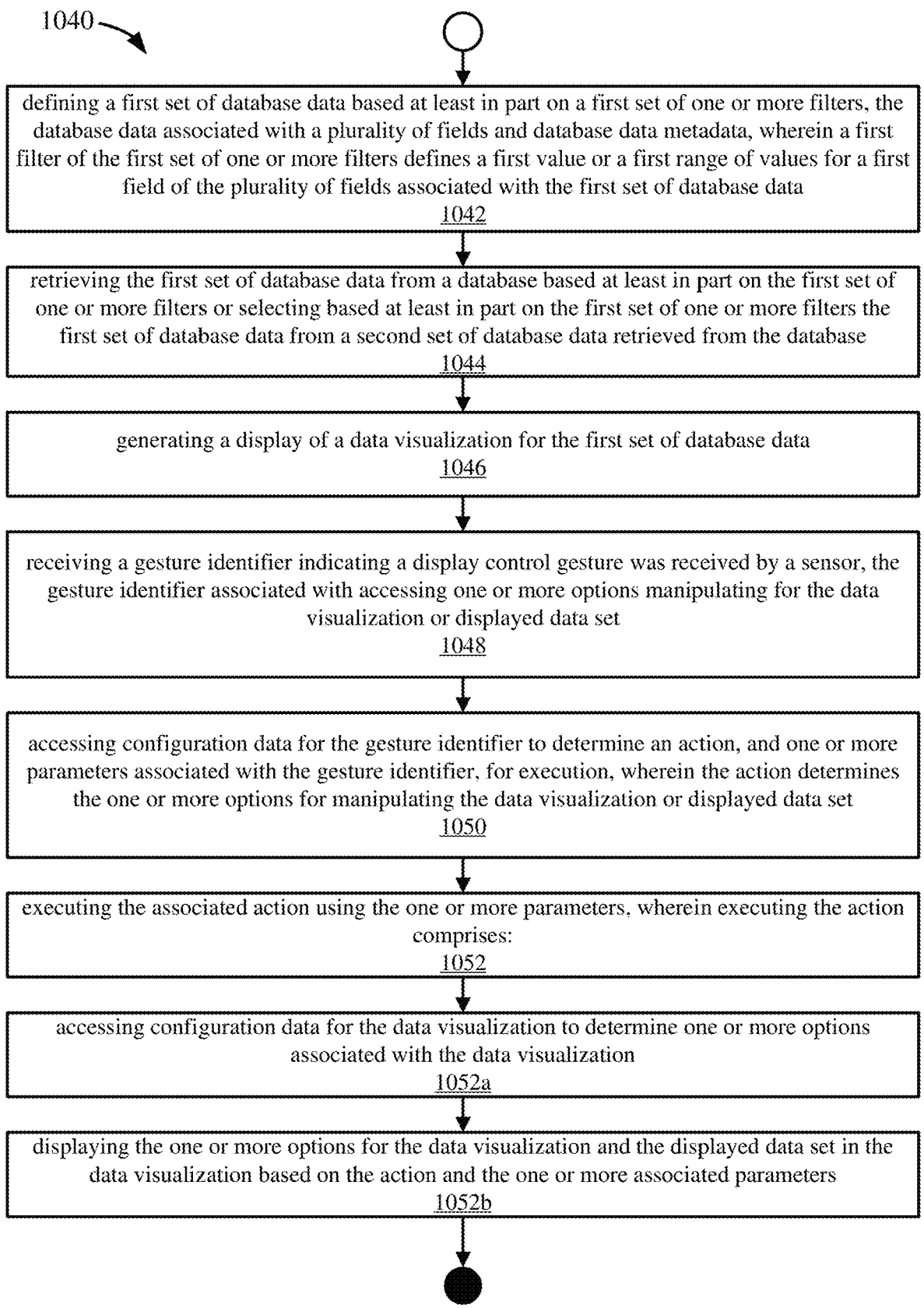
FIG. 10C is a flowchart illustrating a process for manipulating displayed data.

FIG. 10C is a flowchart illustrating a process 1040 for manipulating displayed data. A first set of database data may be defined at 1042 based at least in part on a first set of one or more filters, and the database data may be associated with a plurality of fields and database data metadata. A first filter of the first set of one or more filters may define a first value or a first range of values for a first field of the plurality of fields associated with the first set of database data. The first set of database data may be retrieved at 1044 from a database based at least in part on the first set of one or more filters or may be selected at 1044 based at least in part on the first set of one or more filters the first set of database data from a second set of database data retrieved from the database. A display of a data visualization for the first set of database data may be generated at 1046.

A gesture identifier may be received at 1048 indicating a display control gesture was received by a sensor. The gesture identifier may be associated with accessing one or more options manipulating for the data visualization or displayed data set. Configuration data for the gesture identifier may be accessed at 1050 to determine an action, and one or more parameters associated with the gesture identifier, for execution. The action may determine the one or more options for manipulating the data visualization or displayed data set.

The associated action may be executed at 1052 using the one or more parameters. Executing the action may include accessing configuration data for the data visualization to determine one or more options associated with the data visualization at 1052*a*. Executing the action may also include displaying the one or more options for the data visualization and the displayed data set in the data visualization based on the action and the one or more associated parameters at 1052*b*.

Example 14—Computing Systems

Figure 11:
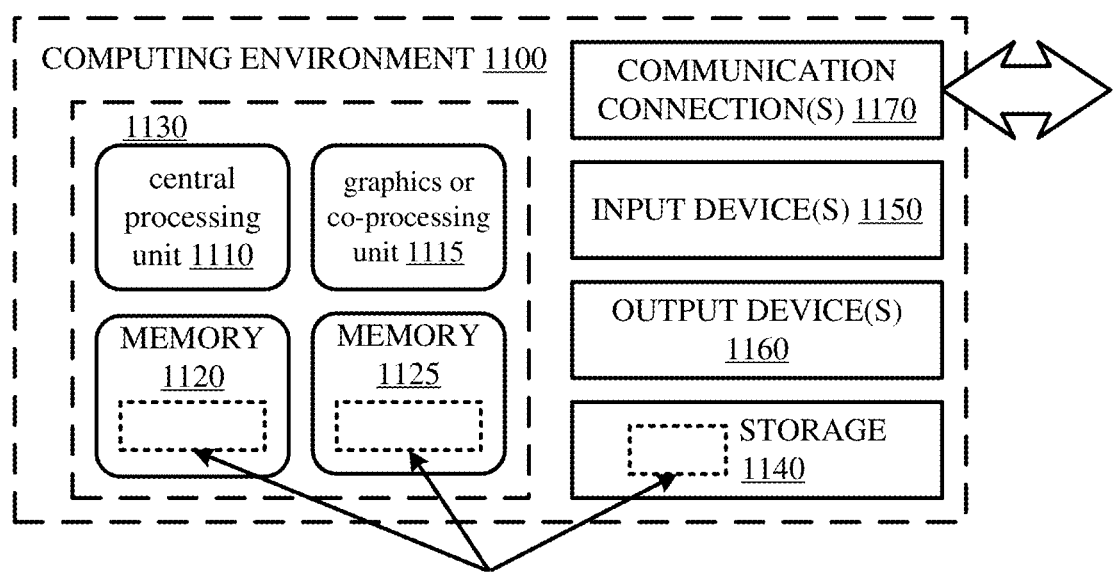
FIG. 11 is a diagram of an example computing system in which described embodiments can be implemented.

FIG. 11 depicts a generalized example of a suitable computing system 1100 in which the described innovations may be implemented. The computing system 1100 is not intended to suggest any limitation as to scope of use or functionality of the present disclosure, as the innovations may be implemented in diverse general-purpose or special-purpose computing systems.

With reference to FIG. 11, the computing system 1100 includes one or more processing units 1110, 1115 and memory 1120, 1125. In FIG. 11, this basic configuration 1130 is included within a dashed line. The processing units 1110, 1115 execute computer-executable instructions, such as for implementing components of the processes of FIGS. 9A-B and 10A-C, the interfaces and transformations of FIGS. 2-7 and 8A-B, or the system of FIG. 1. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 11 shows a central processing unit 1110 as well as a graphics processing unit or co-processing unit 1115. The tangible memory 1120, 1125 may be volatile memory (e.g., registers, cache, RAM), non-volatile memory (e.g., ROM, EEPROM, flash memory, etc.), or some combination of the two, accessible by the processing unit(s) 1110, 1115. The memory 1120, 1125 stores software 1180 implementing one or more innovations described herein, in the form of computer-executable instructions suitable for execution by the processing unit(s) 1110, 1115. The memory 1120, 1125, may also store settings or settings characteristics, databases, data sets, interfaces or displays, or transformations shown in FIGS. 2-7 and 8A-B, the system shown in FIG. 1, or the steps of the processes shown in FIGS. 9A-B and 10A-C.

A computing system 1100 may have additional features. For example, the computing system 1100 includes storage 1140, one or more input devices 1150, one or more output devices 1160, and one or more communication connections 1170. An interconnection mechanism (not shown) such as a bus, controller, or network interconnects the components of the computing system 1100. Typically, operating system software (not shown) provides an operating environment for other software executing in the computing system 1100, and coordinates activities of the components of the computing system 1100.

The tangible storage 1140 may be removable or non-removable, and includes magnetic disks, magnetic tapes or cassettes, CD-ROMs, DVDs, or any other medium which can be used to store information in a non-transitory way and which can be accessed within the computing system 1100. The storage 1140 stores instructions for the software 1180 implementing one or more innovations described herein.

The input device(s) 1150 may be a touch input device such as a keyboard, mouse, pen, or trackball, a voice input device, a scanning device, or another device that provides input to the computing system 1100. The output device(s) 1160 may be a display, printer, speaker, CD-writer, or another device that provides output from the computing system 1100.

The communication connection(s) 1170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 15—Cloud Computing Environment

Figure 12:
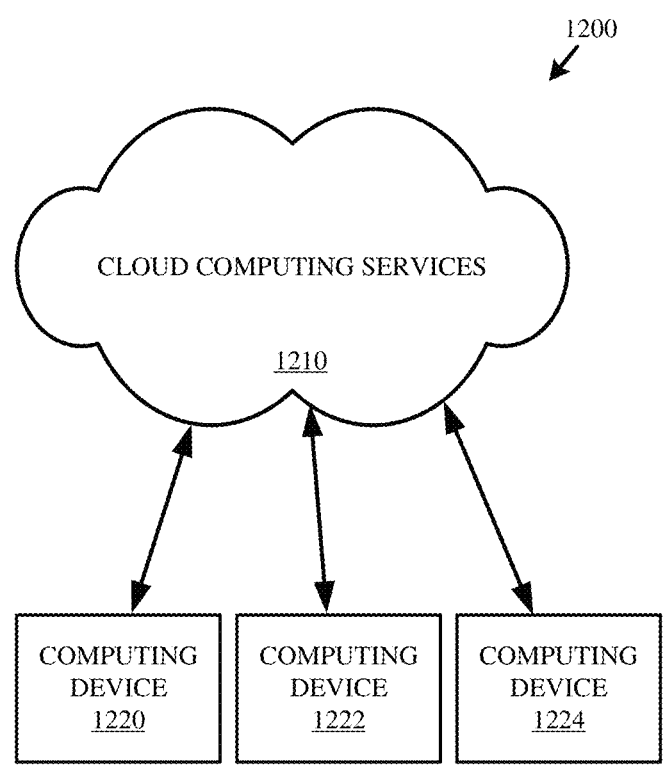
FIG. 12 is an example cloud computing environment that can be used in conjunction with the technologies described herein.

FIG. 12 depicts an example cloud computing environment 1200 in which the described technologies can be implemented. The cloud computing environment 1200 comprises cloud computing services 1210. The cloud computing services 1210 can comprise various types of cloud computing resources, such as computer servers, data storage repositories, networking resources, etc. The cloud computing services 1210 can be centrally located (e.g., provided by a data center of a business or organization) or distributed (e.g., provided by various computing resources located at different locations, such as different data centers and/or located in different cities or countries).

The cloud computing services 1210 are utilized by various types of computing devices (e.g., client computing devices), such as computing devices 1220, 1222, and 1224. For example, the computing devices (e.g., 1220, 1222, and 1224) can be computers (e.g., desktop or laptop computers), mobile devices (e.g., tablet computers or smart phones), or other types of computing devices. For example, the computing devices (e.g., 1220, 1222, and 1224) can utilize the cloud computing services 1210 to perform computing operations (e.g., data processing, data storage, and the like).

Example 16—Implementations

Although the operations of some of the disclosed methods are described in a particular, sequential order for convenient presentation, it should be understood that this manner of description encompasses rearrangement, unless a particular ordering is required by specific language set forth. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware).

Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 11, computer-readable storage media include memory 1120 and 1125, and storage 1140. The term computer-readable storage media does not include signals and carrier waves. In addition, the term computer-readable storage media does not include communication connections (e.g., 1170).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. It should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, carried out by at least one computing device comprising at least one hardware processor and one or more memories coupled to the at least one hardware processor, for traversing data of a data display, the method comprising:
   receiving user input defining configuration data for a gesture identifier, the configuration data specifying one or more display actions to be taken when a specified display control gesture is received for a specified dimension of a plurality of dimensions made available for user selection, the plurality of dimensions being specified for a first set of database data;
   storing the configuration data;
   defining the first set of database data based at least in part on a first set of one or more filters, the database data associated with a plurality of fields, the plurality of fields comprising the plurality of dimensions, and database data metadata, wherein a first filter of the first set of one or more filters defines a first value or a first range of values for a first field of the plurality of fields associated with the first set of database data;
   retrieving the first set of database data from a database based at least in part on the first set of one or more filters or selecting based at least in part on the first set of one or more filters of the first set of database data from a second set of database data retrieved from the database;
   generating a display of a data visualization for the first set of database data;
   receiving the gesture identifier indicating the display control gesture was received by a sensor, the gesture identifier associated with (i) a change in the first range of values for the first filter of the first set of one or more filters, (ii) a change in the first value, or (iii) a change in database data metadata used to define, at least in part, the data visualization;
   accessing the configuration data for the gesture identifier to determine an action, and one or more parameters associated with the gesture identifier, for execution, wherein the action determines that:
      (i) the first value is to be changed, and the one or more parameters indicate at least in part an amount by which the first range of values of the first filter will be changed;
      (ii) at least a portion of the first range of values of the first filter is to be changed, and the one or more parameters indicate at least in part at least one new value that will be assigned to the first filter; or
      (iii) different database data metadata is to be used to generate the data visualization, and the one or more parameters indicate at least in part database data metadata used to modify the data visualization; and
   executing the associated action using the one or more parameters, wherein executing the action comprises:
      generating an updated first set of filters based at least in part on the one or more parameters;
      retrieving a third set of database data defined by the updated first set of filters; and
      generating a display of the retrieved third set of database data in the data visualization based at least in part on the updated first set of filters.

2. The method of claim 1, wherein the third set of database data is retrieved from the first set of database data or the second set of database data.

3. The method of claim 1, the method further comprising:
   prior to receiving the gesture identifier, pre-processing the third set of database data based on displaying the first set of database data, the pre-processing comprising calculating aggregate or display values for the third set of database data, formatting data in the third set of database data, or pre-rendering the display of the retrieved third set of database data.

4. The method of claim 1, wherein retrieving the third set of database data comprises issuing a query in a query language against the database.

5. The method of claim 1, wherein the database data metadata comprises metadata describing a dimensional hierarchy.

6. The method of claim 1, wherein the first field is a measure field or a dimension for the first set of database data.

7. One or more computer-readable storage media comprising:
   computer-executable instructions that, when executed by a computing system, cause the computing system to receive user input defining configuration data for a gesture identifier, the configuration data specifying one or more display actions to be taken when a specified display control gesture is received for a specified database field of a plurality of database fields made available for user selection, the plurality of database fields being specified for a first set of database data;
   computer-executable instructions that, when executed by the computing system, cause the computing system to store the configuration data;
   computer-executable instructions that, when executed by the computing system, cause the computing system to define the first set of database data based at least in part on a first set of one or more filters, the database data associated with the plurality of fields and database data metadata, wherein a first filter of the first set of one or more filters defines a first value or a first range of values for a first field of the plurality of fields associated with the first set of database data;
   computer-executable instructions that, when executed by the computing system, cause the computing system to retrieve the first set of database data from a database based at least in part on the first set of one or more filters or selecting based at least in part on the first set of one or more filters of the first set of database data from a second set of database data retrieved from the database;
   computer-executable instructions that, when executed by the computing system, cause the computing system to generate a display of a data visualization for the first set of database data;
   computer-executable instructions that, when executed by the computing system, cause the computing system to receive the gesture identifier indicating that the display control gesture was received by a sensor, the gesture identifier associated with (i) a change in the first range of values for the first filter of the first set of one or more filters, or (ii) a change in database data metadata used to define, at least in part, the data visualization;
   computer-executable instructions that, when executed by the computing system, cause the computing system to access the configuration data for the gesture identifier to determine an action, and one or more parameters associated with the gesture identifier, for execution, wherein the action determines that a subset of the first range of values of the first filter is to be displayed, or different database data metadata is to be used to generate the data visualization, and the one or more parameters indicate at least in part the subset of the first range of values of the first filter to be used to modify the data visualization; and computer-executable instructions that, when executed by the computing system, cause the computing system to execute the associated action using the one or more parameters, wherein executing the action comprises:
generating an updated first set of filters based at least in part on the one or more parameters;
retrieving a third set of database data defined by the updated first set of filters; and
generating a display of the retrieved third set of database data in the data visualization based at least in part on the updated first set of filters.

8. The one or more computer-readable storage media claim 7, wherein the third set of database data is retrieved from the first set of database data or the second set of database data.

9. The one or more computer-readable storage media of claim 7, the method further comprising:
prior to receiving the gesture identifier, pre-processing the third set of database data based on displaying the first set of database data, the pre-processing comprising calculating aggregate or display values for the third set of database data, formatting data in the third set of database data, or pre-rendering the display of the retrieved third set of database data.

10. The one or more computer-readable storage media of claim 7, wherein retrieving the third set of database data comprises issuing a query in a query language against the database.

11. The one or more computer-readable storage media of claim 7, wherein the database data metadata comprises metadata describing a dimensional hierarchy.

12. The one or more computer-readable storage media of claim 7, wherein the first field is a measure field or a dimension for the first set of database data.

13. A computing system comprising:
memory;
one or more processing units coupled to the memory; and
one or more computer readable storage media storing instructions that, when loaded into the memory, cause the one or more processing units to perform operations for:
receiving user input defining configuration data for a gesture identifier, the configuration data specifying one or more display actions to be taken when a specified display control gesture is received for a specified database field of a plurality of database fields made available for user selection, the plurality of fields being specified for a first set of database data;
storing the configuration data;
defining the first set of database data based at least in part on a first set of one or more filters, the database data associated with the plurality of fields and database data metadata, wherein a first filter of the first set of one or more filters defines a first value or a first range of values for a first field of the plurality of fields associated with the first set of database data;
retrieving the first set of database data from a database based at least in part on the first set of one or more filters or selecting based at least in part on the first set of one or more filters of the first set of database data from a second set of database data retrieved from the database;
generating a display of a data visualization for the first set of database data;
receiving the gesture identifier indicating that the display control gesture was received by a sensor, the gesture identifier associated with accessing one or more options manipulating for the data visualization or displayed data set;
accessing the configuration data for the gesture identifier to determine an action, and one or more parameters associated with the gesture identifier, for execution, wherein the action determines the one or more options for manipulating the data visualization or displayed data set; and
executing the associated action using the one or more parameters, wherein executing the action comprises:
accessing the configuration data for the data visualization to determine one or more options associated with the data visualization; and
displaying the one or more options for the data visualization and the displayed data set in the data visualization based on the action and the one or more associated parameters.

14. The system of claim 13, wherein one or more of the one or more options configures the first set of filters.

15. The system of claim 13, wherein an option of the one or more options accesses an additional database dataset defined by an additional set of filters different from the first set of filters.

16. The system of claim 15, the operations further comprising:
in response to receiving the gesture identifier, pre-processing the additional database dataset defined by the additional set of filters, the pre-processing comprising calculating aggregate or display values for the additional database dataset, formatting data in the additional database dataset, or pre-rendering a display of the additional database dataset.

17. The system of claim 13, wherein an option of the one or more options stores access information for the first database dataset defined by the first set of filters.

18. The method of claim 1, further comprising:
analyzing the first set of database data to determine the plurality of dimensions; and
displaying identifiers for the plurality of dimensions in a graphical user interface;
wherein the specified dimension is selected from the displayed identifiers.

19. The one or more computer-readable storage media of claim 7, further comprising:
computer-executable instructions that, when executed by the computing system, cause the computing system to analyze the first set of database data to determine the plurality of database fields; and
computer-executable instructions that, when executed by the computing system, cause the computing system to display identifiers for the plurality of database fields in a graphical user interface;
wherein the specified database field is selected from the displayed identifiers.

20. The system of claim 13, the operations further comprising:
analyzing the first data set to determine the plurality of database fields; and
displaying identifiers for the plurality of database fields in a graphical user interface;

wherein the specified database field is selected from the displayed identifiers.

* * * * *